US012361890B2

(12) United States Patent
Bai et al.

(10) Patent No.: US 12,361,890 B2
(45) Date of Patent: Jul. 15, 2025

(54) SCANNING CONTROL CIRCUIT AND METHOD FOR DRIVING THE SAME, DISPLAY SUBSTRATE, DISPLAY PANEL AND DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Lu Bai, Beijing (CN); Bo Zhang, Beijing (CN); Yang Zhou, Beijing (CN); Junxiu Dai, Beijing (CN); Yi Qu, Beijing (CN); Song Liu, Beijing (CN); Huijuan Yang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/801,354

(22) PCT Filed: Sep. 24, 2021

(86) PCT No.: PCT/CN2021/120499
§ 371 (c)(1),
(2) Date: Aug. 22, 2022

(87) PCT Pub. No.: WO2023/044829
PCT Pub. Date: Mar. 30, 2023

(65) Prior Publication Data
US 2024/0296797 A1 Sep. 5, 2024

(51) Int. Cl.
*G09G 3/3266* (2016.01)

(52) U.S. Cl.
CPC ... *G09G 3/3266* (2013.01); *G09G 2310/0286* (2013.01); *G09G 2330/021* (2013.01)

(58) Field of Classification Search
CPC combination set(s) only.
See application file for complete search history.

(56) References Cited

U.S. PATENT DOCUMENTS

2004/0256996 A1* 12/2004 Osame ................. G09G 3/3275 315/169.1
2012/0098800 A1 4/2012 Kim
(Continued)

FOREIGN PATENT DOCUMENTS

CN 112771599 A 5/2021

OTHER PUBLICATIONS

Chinese Office Action (w/ English translation) for corresponding CN Application No. 202180002659.9, dated Nov. 14, 2024, 44 pages.

*Primary Examiner* — William Boddie
*Assistant Examiner* — Alecia D English
(74) *Attorney, Agent, or Firm* — Dority & Manning, P.A.

(57) ABSTRACT

A scanning control circuit configured to be applied to a display panel including Q display areas, includes: Q gate initization signal lines, Q light-emittig initialization signal lines and Q scanning control sub-circuits. Each scanning control sub-circuit corresponds to a display area. The scanning control sub-circuit includes a gate scanning control unit and a light-emitting scanning control unit. The gate scanning control unit is configured to be turned on under control of a gate initialization signal from a gate initialization signal from the gate initialization signal line. The light-emitting scanning control unit is configured to be turned on under control of a light-emitting initialization signal from a light-emitting initialization signal line coupled thereto, and to be
(Continued)

turned off under control of another light-emitting initialization signal from the light-emitting initialization signal line.

20 Claims, 13 Drawing Sheets

(56) References Cited

U.S. PATENT DOCUMENTS

| | | | | |
|---|---|---|---|---|
| 2016/0111055 | A1 | 4/2016 | Na et al. | |
| 2019/0115417 | A1* | 4/2019 | Yamazaki | G04G 9/0088 |
| 2019/0304366 | A1* | 10/2019 | Ka | G02F 1/13452 |
| 2021/0027720 | A1 | 1/2021 | Park et al. | |
| 2021/0407351 | A1 | 12/2021 | Huang et al. | |

* cited by examiner

SCANNING CONTROL CIRCUIT AND METHOD FOR DRIVING THE SAME, DISPLAY SUBSTRATE, DISPLAY PANEL AND DEVICE

CROSS-REFERENCE TO RELATED APPLICATION

This application is a national phase entry under 35 USC 371 of International Patent Application No. PCT/CN2021/120499, filed on Sep. 24, 2021, which is incorporated herein by reference in its entirety.

TECHNICAL FIELD

The present disclosure relates to the field of display technologies, and in particular, to a scanning control circuit and a method for driving the same, a display substrate, a display panel and a display device.

BACKGROUND

With advancement of display technologies, semiconductor element technology, core of display devices, has been greatly improved. As current-type light-emitting devices, organic light-emitting diodes (OLED) are increasingly adopted in high-performance display devices due to their properties of self-luminescence, fast response, wide viewing angle, and ability to be fabricated on flexible substrates. At present, with development of flexible OLED display devices, shapes of display devices are becoming more and more abundant. Foldable display devices have become a symbol of research and development capabilities of major manufacturers.

SUMMARY

In an aspect, a scanning control circuit is provided. The scanning control circuit is configured to be applied to a display panel, and the display panel has Q display areas, Q is greater than or equal to 2 (Q≥2), and Q is an integer. The scanning control circuit includes 2Q initialization signal lines and Q scanning control sub-circuits. The 2Q initialization signal lines include Q gate initialization signal lines and Q light-emitting initialization signal lines. Each scanning control sub-circuit corresponds to a display area. The scanning control sub-circuit includes a gate scanning control unit and a light-emitting scanning control unit. Each gate scanning control unit is coupled to a gate initialization signal line, and different gate scanning control units are coupled to different gate initialization signal lines. The gate scanning control unit is configured to be turned on under control of a gate initialization signal from the gate initialization signal line to drive the corresponding display area to display an image, and to be turned off under control of another gate initialization signal from the gate initialization signal line to drive the corresponding display area not to display an image. Each light-emitting scanning control unit is coupled to a light-emitting initialization signal line, and different light-emitting scanning control units are coupled to different light-emitting initialization signal lines. The light-emitting scanning control unit is configured to be turned on under control of a light-emitting initialization signal from the light-emitting initialization signal line to drive the corresponding display area to display an image, and to be turned off under control of another light-emitting initialization signal from the light-emitting initialization signal line to drive the corresponding display area not to display an image.

In some embodiments, a gate scanning control unit and a light-emitting scanning control unit in a same scanning control sub-circuit are arranged side by side along a first direction. The Q display areas are arranged side by side along a second direction. The first direction is substantially perpendicular to the second direction. Gate scanning control units in the Q scanning control sub-circuits are arranged side by side along the second direction, and light-emitting scanning control units in the Q scanning control sub-circuits are arranged side by side along the second direction.

In some embodiments, Q is equal to 2 (Q=2). Two gate initialization signal lines extend along the second direction, and the two gate initialization signal lines are disposed on two opposite sides of the gate scanning control units, respectively. Two light-emitting initialization signal lines extend along the second direction, and the two light-emitting initialization signal lines are disposed on two opposite sides of the light-emitting scanning control units, respectively.

In some embodiments, in each scanning control sub-circuit, the gate scanning control unit is closer to the corresponding display area than the light-emitting scanning control unit.

In some embodiments, the gate scanning control unit includes a plurality of gate shift registers connected in cascade, first S gate shift registers are coupled to a gate initialization signal line, S is greater than or equal to 1 (S≥1), and S is an integer. And/or, the light-emitting scanning control unit includes a plurality of light-emitting shift registers connected in cascade, first S light-emitting shift registers are coupled to a light-emitting initialization signal line, S≥1, and S is an integer.

In another aspect, a display substrate is provided. The display substrate has Q display areas, Q is greater than or equal to 2, and Q is an integer. The display substrate includes a substrate and at least one scanning control circuit disposed on the substrate, the scanning control circuit including 2Q initialization signal lines and Q scanning control sub-circuits. The 2Q initialization signal lines include Q gate initialization signal lines and Q light-emitting initialization signal lines. Each scanning control sub-circuit corresponds to a display area. The scanning control sub-circuit includes a gate scanning control unit and a light-emitting scanning control unit. Each gate scanning control unit is coupled to a gate initialization signal line, and different gate scanning control units are coupled to different gate initialization signal lines. The gate scanning control unit is configured to be turned on under control of a gate initialization signal from the gate initialization signal line to drive the corresponding display area to display an image, and to be turned off under control of another gate initialization signal from the gate initialization signal line to drive the corresponding display area not to display an image. Each light-emitting scanning control unit is coupled to a light-emitting initialization signal line, and different light-emitting scanning control units are coupled to different light-emitting initialization signal lines. The light-emitting scanning control unit is configured to be turned on under control of a light-emitting initialization signal from the light-emitting initialization signal line to drive the corresponding display area to display an image, and to be turned off under control of another light-emitting initialization signal from the light-emitting initialization signal line to drive the corresponding display area not to display an image.

In some embodiments, the Q display areas include a first display area and a second display area arranged side by side along a second direction. In the scanning control circuit, the Q scanning control sub-circuits include a first scanning control sub-circuit corresponding to the first display area, a second scanning control sub-circuit corresponding to the second display area, and the Q gate initialization signal lines include a first gate initialization signal line and a second gate initialization signal line. The first scanning control sub-circuit includes a first gate scanning control unit, and the second scanning control sub-circuit includes a second gate scanning control unit. The first gate initialization signal line is coupled to the first gate scanning control unit, and the second gate initialization signal line is coupled to the second gate scanning control unit.

Each of the first scanning control sub-circuit and the second scanning control sub-circuit further includes a first gate voltage signal line, a second gate voltage signal line, a first gate clock signal line and a second gate clock signal line that are coupled to a corresponding one of the first gate scanning control unit and the second gate scanning control unit. Along a first direction and in a direction pointing from an inside to an outside of a corresponding one of the first display area and the second display area, the second gate initialization signal line, the second gate voltage signal line, the first gate voltage signal line, the first gate clock signal line, the second gate clock signal line and the first gate initialization signal line are arranged in sequence, and the first gate scanning control unit and the second gate scanning control unit are located between the second gate initialization signal line and the first gate voltage signal line. The first direction is substantially perpendicular to the second direction.

In some embodiments, in the scanning control circuit, the Q scanning control sub-circuits include a second scanning control sub-circuit, and the Q gate initialization signal lines include a second gate initialization signal line; and the second scanning control sub-circuit includes a second gate scanning control unit. The second gate scanning control unit includes a plurality of second gate shift registers that are connected in cascade and arranged side by side, and each second gate shift register includes a second gate input transistor. The second scanning control sub-circuit further includes S second gate initial connection lines respectively corresponding to first S second gate shift registers. An end of each second gate initial connection line is coupled to the second gate initialization signal line, and another end of each second gate initial connection line is coupled to a second gate input transistor in a corresponding second gate shift register; S is greater than or equal to 1, and S is an integer.

In some embodiments, the Q scanning control sub-circuits include a second scanning control sub-circuit, the second scanning control sub-circuit includes at least one second gate initial connection line, and the display substrate includes a semiconductor layer, a first gate conductive layer, a second gate conductive layer and a source-drain conductive layer that are sequentially disposed on the substrate. A second gate initial connection line includes at least one first connection segment and at least one second connection segment. The at least one first connection segment is located in the source-drain conductive layer. An orthogonal projection of the first connection segment on the substrate is separated from an orthogonal projection of any signal line in the second scanning control sub-circuit on the substrate. The at least one second connection segment is located in the semiconductor layer. An orthogonal projection of the second connection segment on the substrate is separated from an orthogonal projection of any signal line in the second scanning control sub-circuit on the substrate. A resistivity of the second connection segment is greater than a resistivity of the first connection segment.

In some embodiments, the Q gate initialization signal lines include a second gate initialization signal line, and the scanning control circuit further includes a second gate voltage signal line. The second gate initial connection line further includes at least one third connection segment, and the at least one third connection segment is located in the first gate conductive layer or the second gate conductive layer. An orthogonal projection of the third connection segment on the substrate intersects with an orthogonal projection of at least one of the second gate initialization signal line and the second gate voltage signal line on the substrate.

In some embodiments, connection segments included in the second gate initial connection line are connected in sequence. The source-drain conductive layer includes a plurality of first connection patterns, and each first connection pattern electrically connects adjacent two connection segments of the second gate initial connection line through via holes.

In some embodiments, the Q gate initialization signal lines include includes a second gate initialization signal line, and the scanning control circuit further includes a second gate voltage signal line. The second scanning control sub-circuit further includes a second gate scanning control unit, the second gate scanning control unit includes second gate shift registers, and the second gate shift registers each include a second gate input transistor. The second gate initial connection line includes a first connection segment, a second connection segment and a third connection segment that are connected in sequence. An orthogonal projection of the third connection segment on the substrate intersects with orthogonal projections of the second gate voltage signal line and the second gate initialization signal line on the substrate. An end of the first connection segment away from the third connection segment is coupled to a corresponding second gate input transistor, and an end of the third connection segment away from the first connection segment is coupled to the second gate initialization signal line.

In some embodiments, the second gate initial connection line is located between adjacent two second gate shift registers.

In some embodiments, the display substrate includes a source-drain conductive layer, the second scanning control sub-circuit further includes a plurality of second gate connection lines respectively corresponding to remaining second gate shift registers except the first S second gate shift registers. An end of each second gate connection line is coupled to an output terminal of a previous-stage second gate shift register, and another end of each second gate connection line is coupled to a second gate input transistor in a corresponding second gate shift register. The plurality of second gate connection lines are located in the source-drain conductive layer.

In some embodiments, in the scanning control circuit, the Q scanning control sub-circuits include a first scanning control sub-circuit, and the Q gate initialization signal lines include a first gate initialization signal line; and the first scanning control sub-circuit includes a first gate scanning control unit. The first gate scanning control unit includes a plurality of first gate shift registers that are connected in cascade and arranged side by side, and each first gate shift register includes a first gate input transistor. The first scanning control sub-circuit further includes S first gate initial connection lines respectively corresponding to first S first gate shift registers. An end of each first gate initial connection line is coupled to the first gate initialization signal line, and another end of each first gate initial connection line is coupled to a first gate input transistor in a corresponding first gate shift register.

In some embodiments, the Q display areas include a first display area and a second display area arranged side by side along a second direction. In the scanning control circuit, the Q scanning control sub-circuits include a first scanning control sub-circuit corresponding to the first display area, a second scanning control sub-circuit corresponding to the second display area, and the Q gate initialization signal lines include a first light-emitting initialization signal line and a second light-emitting initialization signal line. The first scanning control sub-circuit includes a first light-emitting scanning control unit, and the second scanning control sub-circuit includes a second light-emitting scanning control unit. The first light-emitting initialization signal line is coupled to the first light-emitting scanning control unit, and the second light-emitting initialization signal line is coupled to the second light-emitting scanning control unit.

Each of the first scanning control sub-circuit and the second scanning control sub-circuit further includes a plurality of light-emitting initialization signal lines, a first light-emitting voltage signal sub-line, a second light-emitting voltage signal sub-line, a second light-emitting voltage signal line, a first light-emitting clock signal line and a second light-emitting clock signal line that are coupled to a corresponding one of the first light-emitting scanning control unit and the second light-emitting scanning control unit. Along a first direction from an inside to an outside of a corresponding one of the first display area and the second display area, the second light-emitting initialization signal line, the first light-emitting voltage signal sub-line, the second light-emitting voltage signal line, the second light-emitting voltage signal sub-line, the first light-emitting clock signal line, the second light-emitting clock signal line and the first light-emitting initialization signal line are arranged in sequence, and the first light-emitting scanning control unit and the second light-emitting scanning control unit are located between the first light-emitting voltage signal sub-line and the first light-emitting clock signal line. The first direction is substantially perpendicular to the second direction.

In some embodiments, the second light-emitting scanning control unit includes a plurality of second light-emitting shift registers that are connected in cascade and arranged side by side along the second direction, and each second light-emitting shift register includes a second light-emitting input transistor. The second light-emitting control sub-circuit further includes S second light-emitting initial connection lines respectively corresponding to first S second light-emitting shift registers. An end of each second light-emitting initial connection line is coupled to the second light-emitting initialization signal line, and another end of each second light-emitting initial connection line is coupled to a second light-emitting input transistor in a corresponding second light-emitting shift register. S is greater than or equal to 1, and S is an integer.

In some embodiments, the display substrate includes a semiconductor layer, a first gate conductive layer, a second gate conductive layer and a source-drain conductive layer that are sequentially disposed on the substrate. The second light-emitting initial connection line includes at least one fourth connection segment, at least one fifth connection segment and at least one sixth connection segment. The at least one fourth connection segment is located in the source-drain conductive layer. An orthogonal projection of the fourth connection segment on the substrate is separated from an orthogonal projection of any signal line in the second light-emitting control sub-circuit on the substrate. The at least one fifth connection segment is located in the semiconductor layer. An orthogonal projection of the fifth connection segment on the substrate is separated from the orthogonal projection of the any signal line in the second light-emitting control sub-circuit on the substrate. A resistivity of the fifth connection segment is greater than a resistivity of the fourth connection segment. The at least one sixth connection segment is located in the first gate conductive layer or the second gate conductive layer. An orthogonal projection of the sixth connection segment on the substrate intersects with an orthogonal projection of at least one of the second light-emitting initialization signal line, the first light-emitting voltage signal sub-line and the second light-emitting voltage signal line on the substrate.

In some embodiments, connection segments included in the second light-emitting initial connection line are connected in sequence. The source-drain conductive layer includes a plurality of second connection patterns, and each second connection pattern electrically connects adjacent two connection segments of the second light-emitting initial connection line through via holes.

In some embodiments, the second light-emitting initial connection line includes a fourth connection segment, a first sixth connection segment, a fifth connection segment and a second sixth connection segment that are connected in sequence. An orthogonal projection of the first sixth connection segment on the substrate intersects with an orthogonal projection of the second light-emitting voltage signal line on the substrate. An orthogonal projection of the second sixth connection segment on the substrate intersects with orthogonal projections of the first light-emitting voltage signal sub-line and the second light-emitting initialization signal line on the substrate. An end of the fourth connection segment away from the second sixth connection segment is coupled to a corresponding second light-emitting input transistor, and an end of the second sixth connection segment away from the fourth connection segment is coupled to the second light-emitting initialization signal line.

In yet another aspect, a display panel is provided. The display panel includes the display substrate as described in any of the above embodiments and a control integrated circuit. The control integrated circuit is coupled to the initialization signal lines in the scanning control circuit in the display substrate. The control integrated circuit is configured to: transmit a first initialization signal to an initialization signal line corresponding to a display area that does not need to display an image, so as to turn off a scanning control sub-circuit corresponding to the display area that does not need to display an image; and transmit second initialization signals to initialization signal lines corresponding to a display area that needs to display an image, so as to turn on a scanning control sub-circuit corresponding to the display area that needs to display an image. The first initialization signal includes the another gate initialization signal or the another light-emitting initialization signal, and the second initialization signals include the gate initialization signal and the light-emitting initialization signal.

In yet another aspect, a display device is provided. The display device includes the display panel as described in any of the above embodiments.

In some embodiments, the display device is capable of being folded along a boundary line of adjacent display areas.

In yet another aspect, a method for driving a scanning control circuit is provided. The method is for use in driving the scanning control circuit in any of the above embodiments. The method includes: if a target display area of the display panel does not display an image, providing, by an initialization signal line coupled to a scanning control sub-circuit corresponding to the target display area, a first initialization signal to the scanning control sub-circuit to tum off the scanning control sub-circuit; and if the target display area needs to display an image, providing, by initialization signal lines coupled to the scanning control sub-circuit corresponding to the target display area, second initialization signals to the scanning control sub-circuit to turn on the scanning control sub-circuit. The first initialization signal includes the another gate initialization signal or the another light-emitting initialization signal, and the second initialization signals include the gate initialization signal and the light-emitting initialization signal.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on actual sizes of products, actual processes of methods, and actual timings of signals involved in the embodiments of the present disclosure.

DETAILED DESCRIPTION

Figure 1A:
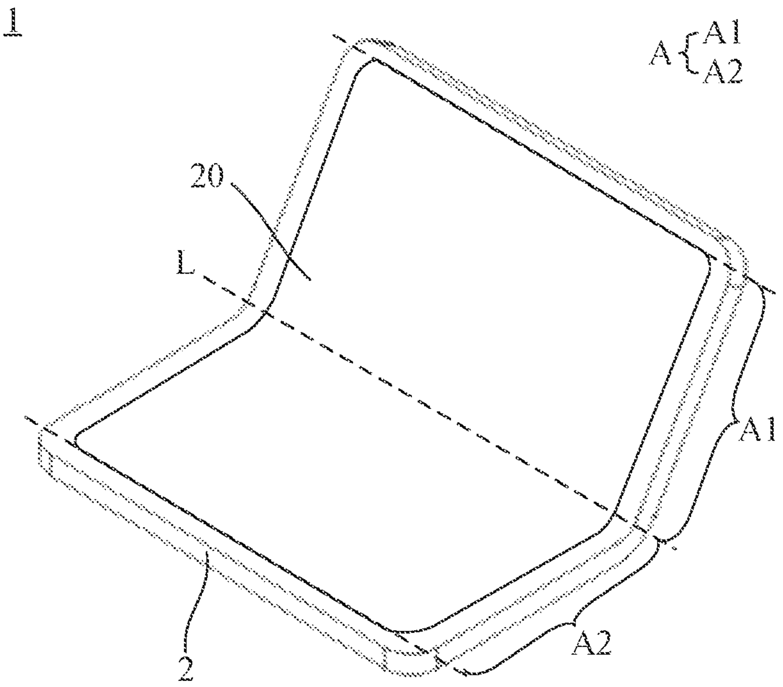
FIG. 1A is a structural diagram of a display device, in accordance with some embodiments.

The following descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

Technical solutions in some embodiments of the present disclosure will be described clearly and completely below with reference to the accompanying drawings below. However, the described embodiments are merely some but not all embodiments of the present disclosure. All other embodiments obtained by a person of ordinary skill in the art on a basis of the embodiments of the present disclosure shall be included in the protection scope of the present disclosure.

Unless the context requires otherwise, throughout the description and the claims, the term “comprise” and other forms thereof such as the third-person singular form “comprises” and the present participle form “comprising” are construed in an open and inclusive meaning, i.e., “including, but not limited to”. In the description of the specification, the terms such as “one embodiment,” “some embodiments,” “exemplary embodiments,” “example.” “specific example” or “some examples” are intended to indicate that specific features, structures, materials or characteristics related to the embodiment(s) or example(s) are included in at least one embodiment or example of the present disclosure. Schematic representations of the above term do not necessarily refer to the same embodiment(s) or examples(s). In addition, the specific features, structures, materials or characteristics may be included in any one or more embodiments or examples in any suitable manner.

Hereinafter, the terms such as “first” and “second” are only used for descriptive purposes, and are not to be construed as indicating or implying the relative importance or implicitly indicating the number of indicated technical features. Thus, a feature defined with “first” or “second” may explicitly or implicitly include one or more of the features. In the description of the embodiments of the present disclosure, the term "multiple," "a plurality of" or "the plurality of" means two or more unless otherwise specified.

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art in view of measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be, for example, a difference between two equals of less than or equal to 5%of either of the two equals.

In the description of some embodiments, the terms "coupled", "connected" and derivatives thereof may be used. For example, the term "connected" may be used in the description of some embodiments to indicate that two or more components are in direct physical or electrical contact with each other.

The phrase "A and/or B" includes the following three combinations: only A, only B, and a combination of A and B.

The phrase "at least one of A, B, and C" has the same meaning as "at least one of A, B, or C", and both include the following combinations of A, B, and C: only A, only B, only C, a combination of A and B, a combination of A and C, a combination of B and C, and a combination of A, B and C.

The term such as "about", "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

Exemplary embodiments are described herein with reference to segmental views and/or plan views as idealized exemplary drawings. In the accompanying drawings, thicknesses of layers and sizes of regions are enlarged for clarity. Variations in shapes with respect to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

In the shift register provided in the embodiments of the present disclosure, the transistors used in the shift register may be thin film transistors (TFTs), field effect transistors (such as metal oxide semiconductor (MOS) field effect transistors), or other switching devices with the same properties. The embodiments of the present disclosure are described by taking an example where the transistors are TFTs.

In the shift register provided in the embodiments of the present disclosure, a control electrode of each TFT used in the shift register is a gate of the TFT, a first electrode of the TFT is one of a source and a drain of the TFT, and a second electrode of the TFT is another one of the source and the drain of the TFT. Since the source and the drain of the TFT may be symmetrical in terms of their structure, there may be no difference in structure between the source and the drain of the TFT. That is, there may be no difference in structure between the first electrode and the second electrode of the TFT in the embodiments of the present disclosure. For example, in a case where the transistor is a P-type transistor, the first electrode of the transistor is a source, and the second electrode of the transistor is a drain. For example, in a case where the transistor is an N-type transistor, the first electrode of the transistor is a drain, and the second electrode of the transistor is a source.

In the embodiments of the present disclosure, a capacitor may be manufactured separately through a process. For example, the capacitor is realized by manufacturing special capacitor electrodes, and each capacitor electrode of the capacitor may be realized by a metal layer, a semiconductor layer (e.g., doped with polysilicon), or the like. The capacitor may also be realized by a parasitic capacitance between transistors, by a parasitic capacitance between a transistor and other device or wiring, or by a parasitic capacitance between wirings of a circuit.

In the shift register provided in the embodiments of the present disclosure, nodes such as a first node and a second node do not represent actual components, but represent junction points of related electrical connections in circuit diagrams. That is, these nodes are nodes that are equivalent to the junction points of the related electrical connections in the circuit diagram.

A "low voltage" in the shift register provided in the embodiments of the present disclosure refers to a voltage that may cause an operated P-type transistor included in the shift register to be turned on, and may not cause an operated N-type transistor included in the shift register to be turned on (i.e., the N-type transistor being turned off); correspondingly, a "high voltage" refers to a voltage that may cause the operated N-type transistor included in the shift register to be turned on, and may not cause the operated P-type transistor included in the shift register to be turned on (i.e., the P-type transistor being turned off).

FIG. 1A is a diagram showing a structure of a display device according to some embodiments. As shown in FIG. 1A, some embodiments of the present disclosure provide a display device 1. The display device 1 may be a television, a mobile phone, a computer, a notebook computer, a tablet computer, or a vehicle-mounted computer.

The display device 1 has at least two display areas A, and the display device 1 is capable of being folded along a boundary line L of adjacent display areas A. In addition, at least one display area A may not display an image when other display area(s) A display an image.

For example, as shown in FIG. 1A, the display device 1 has a first display area A1 and a second display area A2, and portions of the display device 1 in the first display area A1 and the second display area A2 are folded along the boundary line L. The first display area A1 and the second display area A2 may display images simultaneously; alternatively, in a case where the first display area A1 displays an image, the second display area A2 does not display an image; alternatively, in a case where the second display area A2 displays an image, the first display area A1 does not display an image.

It will be noted that, the boundary line L may be a transitional bendable area, and the bendable area can also display an image. A device such as a hinge may be provided in the bendable area to realize the bending or unfolding of the screen.

As shown in FIG. 1A, the display device 1 includes a housing 10, and a display panel 20, a circuit board, a display driving integrated circuit and other electronic components that are arranged in the housing 10.

The display panel 20 may be an organic light-emitting diode (OLED) display panel, a quantum dot light-emitting diode (QLED) display panel, or a micro light-emitting diodes (Micro LED) display panel, which is not limited in the present disclosure.

Some embodiments of the present disclosure will be schematic described below by taking an example in which the display panel 20 is an OLED display panel.

Figure 2:
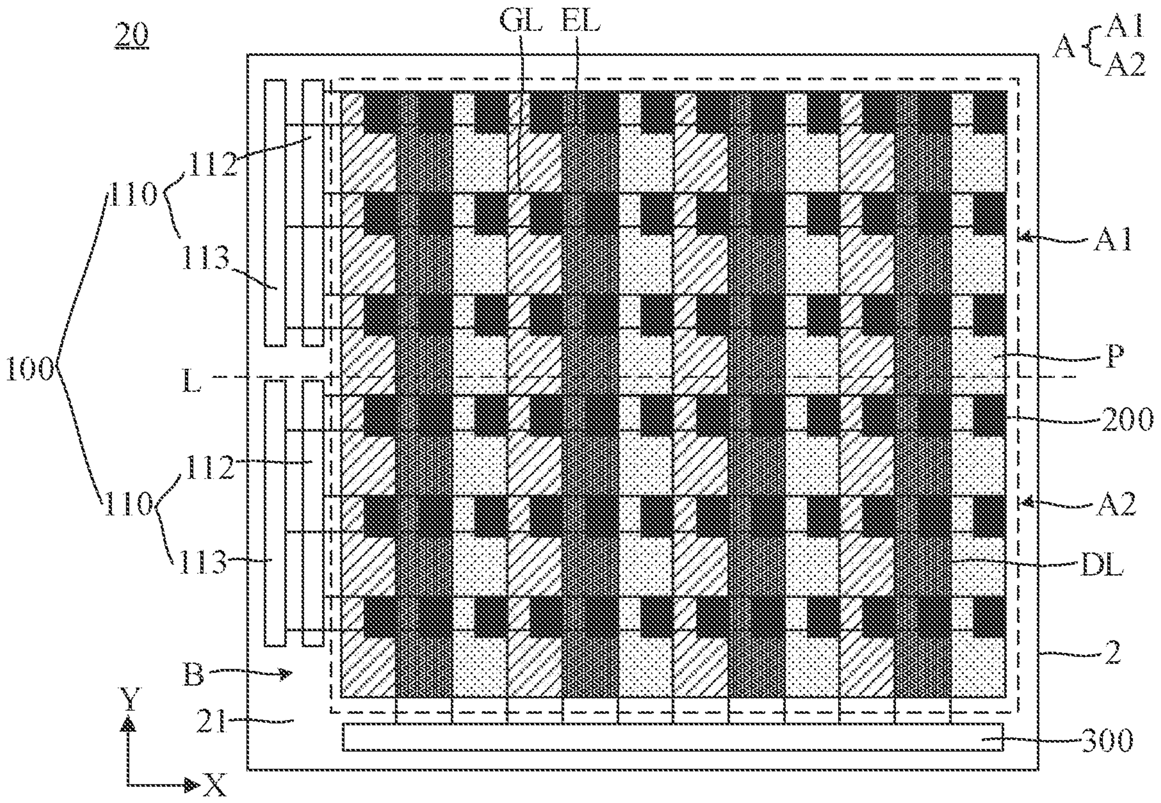
FIG. 2 is a diagram of a driving architecture of a display panel, in accordance with some embodiments.

In some embodiments, as shown in FIG. 2, the display panel 20 has display areas A and a peripheral area B disposed on at least one side of the display areas A. FIG. 2 illustrates an example in which the peripheral area B is disposed around the display areas A.

Referring to FIG. 2, in the display panel 20, the display area A is provided with sub-pixels P emitting light of various colors. The sub-pixels P emitting light of various colors include at least a first sub-pixel emitting light of a first color, a second sub-pixel emitting light of a second color and a third sub-pixel emitting light of a third color. The first, second and third colors are three primary colors (such as red, green and blue).

Figure 1B:
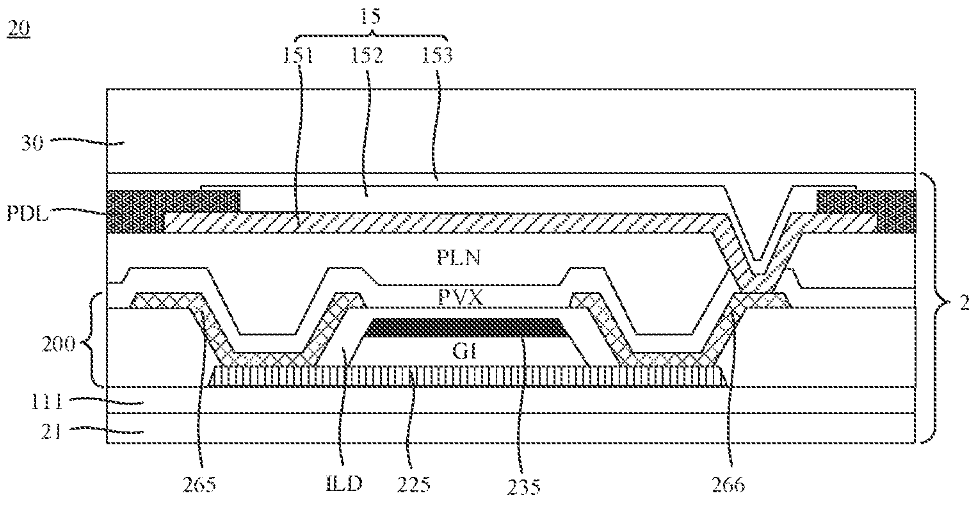
FIG. 1B is sectional view of a partial of a display panel, in accordance with some embodiments.

As shown in FIG. 1B, the display panel 20 includes a display substrate 2 and an encapsulation layer 30 for encapsulating the display substrate 2.

The encapsulation layer 30 may be an encapsulation film or an encapsulation substrate.

In some embodiments, referring to FIGS. 1B and 2, each sub-pixel P includes a light-emitting device 15 and a pixel driving circuit 200 that are disposed on a substrate 21. The pixel driving circuit 200 includes a plurality of transistors. The transistor includes an active layer 225, a source 265, a drain 266, a gate 235 and a gate insulating layer GI. The source 265 and the drain 266 are in contact with the active layer 225. In a direction perpendicular to the substrate 21 and moving away from the substrate 21, the light-emitting device 15 includes a first electrode 151, a light-emitting functional layer 152 and a second electrode 153.

For example, as shown in FIG. 1B, the first electrode 151 is an anode of the light-emitting device 15, and the second electrode 153 is a cathode of the light-emitting device 15. The first electrode 151 is electrically connected to a source 265 or a drain 266 of a transistor serving as a driving transistor among the plurality of transistors 141. FIG. 1B illustrates an example in which the first electrode 151 is electrically connected to the drain of the transistor 141.

In some embodiments, the light-emitting functional layer 152 only includes a light-emitting layer. In some other embodiments, in addition to the light-emitting layer, the light-emitting functional layer 152 further includes at least one of an electron transport layer (ETL), an electron injection layer (EIL), a hole transport layer (HTL) and a hole injection layer (HIL).

In some embodiments, as shown in FIG. 1B, the display substrate 2 further includes a passivation layer PVX, and the passivation layer PVX is disposed on a side of the pixel driving circuit 200 away from the substrate 21.

In some embodiments, as shown in FIG. 1B, the display substrate 2 further includes a first planarization layer PLN, and the first planarization layer PLN is disposed on a side of the passivation layer PVX away from the substrate 21.

In some embodiments, as shown in FIG. 1B, the display substrate 10 further includes a pixel defining layer PDL, the pixel defining layer PDL includes a plurality of openings, and a light-emitting device 15 corresponds to an opening.

In some embodiments, as shown in FIG. 1B, the display substrate 2 further includes a buffer layer 111, and the buffer layer 111 is disposed between the pixel driving circuit 14 and the substrate 21.

For convenience of description, the plurality of sub-pixels P are described in the embodiments of the present disclosure by taking an example in which the plurality of sub-pixels P are arranged in a matrix. In this case, as shown in FIG. 2, sub-pixels P arranged in a line along a first direction X are referred to as sub-pixels P in a same row; sub-pixels P arranged in a column along a second direction Y are referred to as sub-pixels P in a same column.

Referring to FIG. 2, each sub-pixel P includes the pixel driving circuit 200 for controlling display of the sub-pixel P. Pixel driving circuits 200 located in a same row are coupled to a same gate scanning signal line GL and a same light-emitting scanning signal line EL, and pixel driving circuits 200 located in a same column are coupled to a same data line DL.

The gate scanning signal line GL is used for transmitting a gate scanning signal to the pixel driving circuits 200 coupled thereto. The light-emitting scanning signal line EL is used for transmitting a light-emitting scanning signal to the pixel driving circuits 200 coupled thereto. The data line DL is used for transmitting a data signal to the pixel driving circuits 200 coupled thereto.

As shown in FIG. 2, the peripheral area B of the display panel 20 is provided with a scanning control circuit 100 and a source driving circuit 300 therein.

In some embodiments, as shown in FIG. 2, the scanning control circuit 100 includes a gate scanning control unit 112 and a light-emitting scanning control unit 113. The gate scanning signal comes from the gate scanning control unit 112 coupled to the gate scanning signal line GL, the light-emitting scanning signal comes from the light-emitting scanning control unit 113 coupled to the light-emitting scanning signal line EL, and the data signal comes from the source driving circuit 300 coupled to each data line DL.

It will be noted that, the gate scanning control unit 112 and the light-emitting scanning control unit 113 may be integrated in a single circuit. For example, each shift register in a scanning control unit 111 (referring to FIG. 3) includes at least two output terminals, an output terminal outputs a gate scanning signal, and another output terminal outputs a light-emitting scanning signal, which is not limited in detail in the present disclosure.

In some embodiments, as shown in FIG. 2, the scanning driving circuit 100 may be disposed on an edge of the substrate 21 along an extending direction of the gate scanning signal line GL, and the source driving circuit 300 may be disposed on an edge of the substrate 21 along an extending direction of the data line DL. Thus, the pixel driving circuits 200 in the display panel 100 are driven for display.

In some embodiments, referring to FIG. 2, the scanning control circuit 100 is a gate driver on array (GOA) circuit. That is, the scanning control circuit 100 is directly integrated in the display substrate of the display panel 20 to reduce a bezel size of the display panel 20. Therefore, the manufacturing cost of the display panel 20 is reduced, and a narrow bezel design is realized. The following embodiments are described by taking an example in which the scanning control circuit 100 is the GOA circuit.

Figure 3:
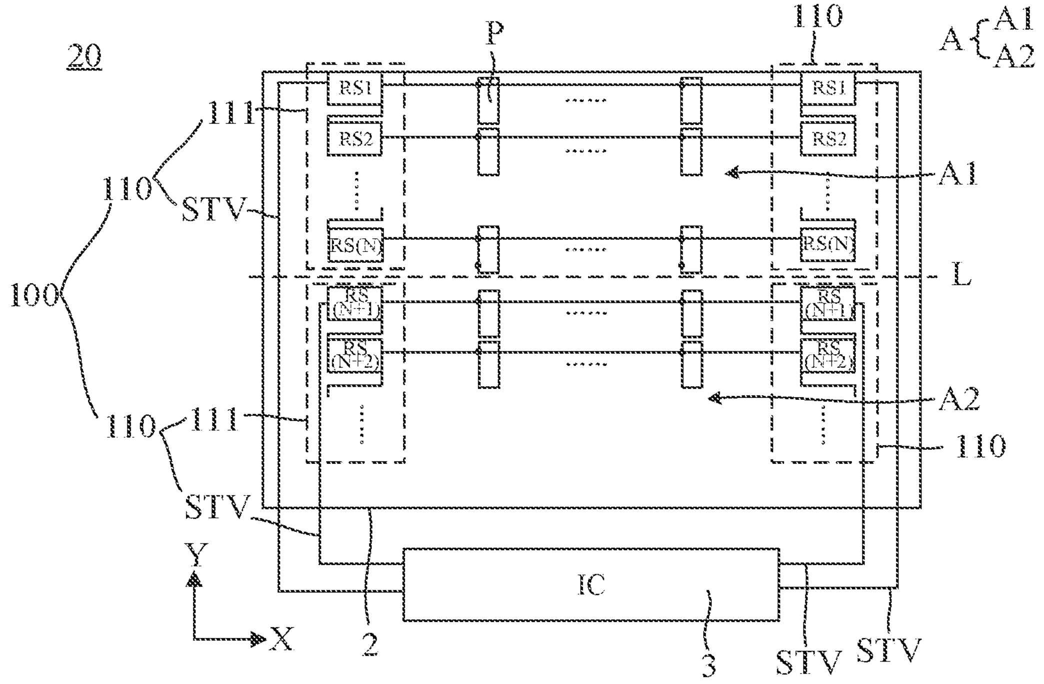
FIG. 3 is a diagram of an architecture of a scanning control circuit of a display panel, in accordance with some embodiments.
Figure 4:
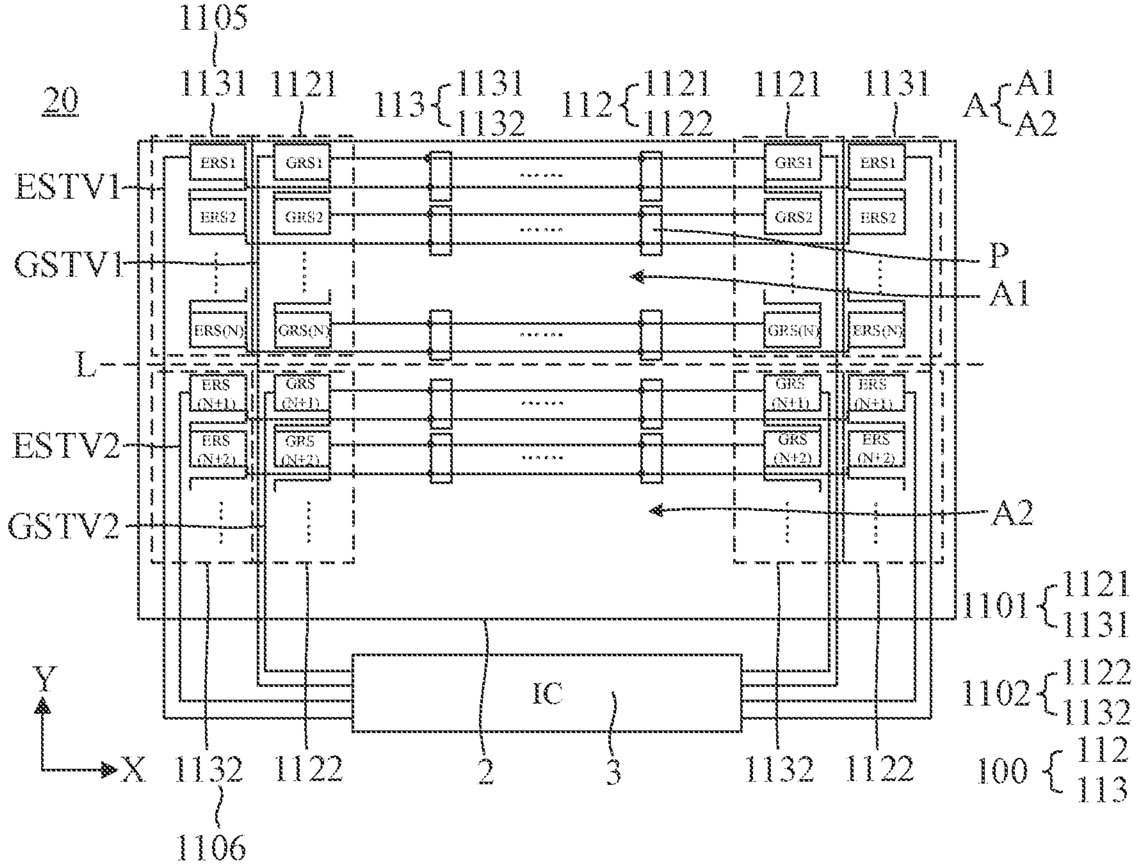
FIG. 4 is a diagram of an architecture of a scanning control circuit of a display panel, in accordance with some other embodiments.

It will be noted that, as shown in FIG. 2, a scanning control circuit 100 is disposed on one side of the display areas A as a whole of the display panel 20, and the scanning control circuit 100 drives the gate scanning signal lines GL sequentially from the side line by line, and drives the light-emitting scanning signal lines EL sequentially from the side line by line. That is, a single-sided driving manner is taken as an example for description. As shown in FIGS. 3 and 4, two scanning control circuits 100 are disposed on two sides of the display areas A as a whole of the display panel 20, and the scanning control circuits 100 drive the gate scanning signal lines GL sequentially from the two sides line by line, and drive the light-emitting scanning signal line EL sequentially from the two sides line by line. That is, a double-sided driving manner is taken as an example for description.

In some embodiments, referring to FIGS. 2 and 4, the scanning control circuit 100 includes a gate scanning control unit 112 and a light-emitting scanning control unit 113. The gate scanning control unit 112 includes gate shift registers (GRS1, GRS2, . . . , GRS(N)) that are connected in cascade, and the light-emitting scanning control unit 113 includes at least light-emitting shift registers (ERS1, ERS2, . . . , ERS(N)) that are connected in cascade. Here, N is a positive integer.

It will be noted that, the gate shift registers (GRS1, GRS2, . . . , GRS(N)) are each coupled to at least one gate scanning signal line GL, and the light-emitting shift registers (ERS1, ERS2, . . . , ERS(N)) are each coupled to at least one light-emitting scanning signal line EL. For example, as shown in FIG. 4, each gate shift register is coupled to a gate scanning signal line GL, and each light-emitting shift register is coupled to a light-emitting scanning signal line EL.

Figure 5:
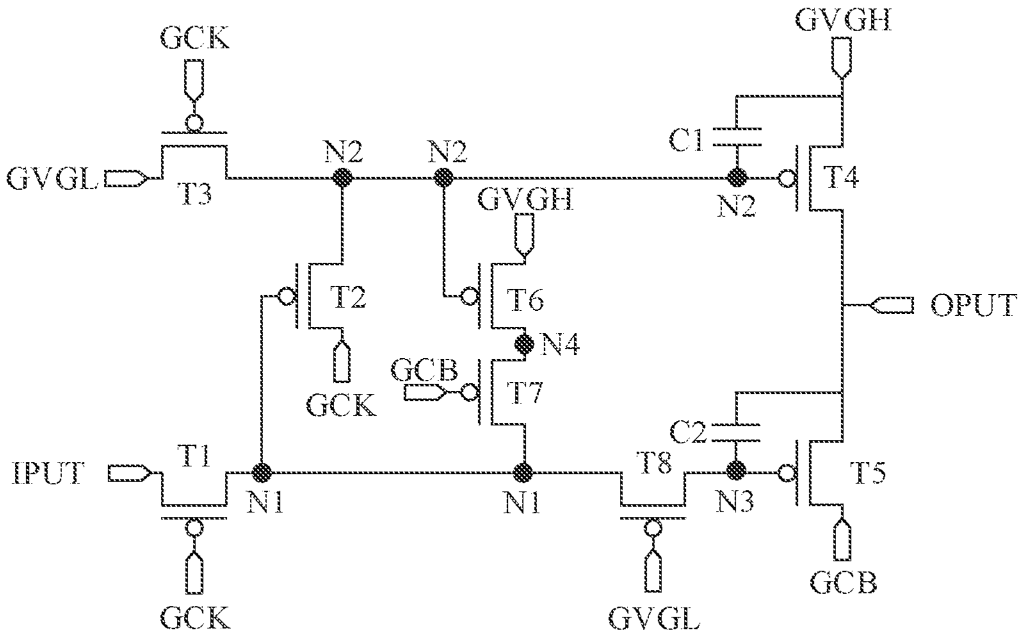
FIG. 5 is an equivalent circuit diagram of a gate shift register, in accordance with some embodiments.
Figure 7:
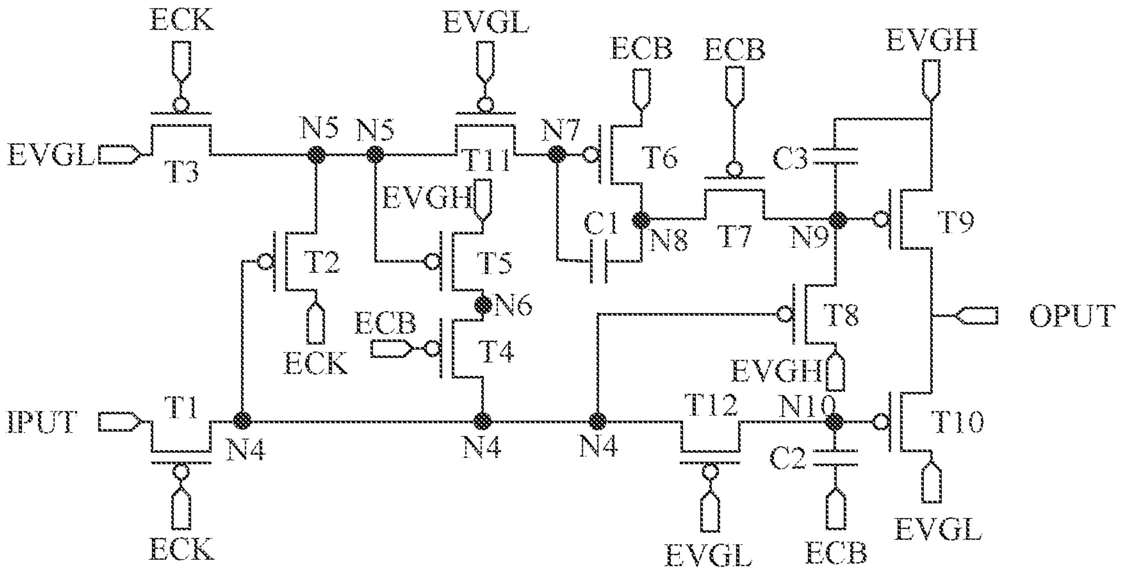
FIG. 7 is an equivalent circuit diagram of a light-emitting shift register, in accordance with some embodiments.

In some embodiments, referring to FIGS. 3, 5 and 7, for every two adjacent shift registers RS, an input terminal IPUT of a next-stage shift register RS is coupled to an output terminal OPUT of a current-stage shift register RS, and an input terminal IPUT of a first-stage shift register RS1 is coupled to a corresponding initialization signal line STV.

In the related art, the display device is a foldable display device having two display areas. In some scenarios, for example, in a case where the foldable display device is in a folded state, one display area displays an image, and the other display area displays a black image.

However, the display area not for displaying an image is still refreshed, and displays the black image. That is, in this case, in a frame cycle, all rows of sub-pixels P in the display area not used for displaying images are still scanned and charged row by row, which will not only generate excess power consumption, but also waste refresh time.

In order to solve the above problems, some embodiments of the present disclosure provide the scanning control circuit 100. Referring to FIGS. 1A and 2, the scanning control circuit 100 is applied to the display panel 20 having a plurality of display areas A. As shown in FIG. 3, the scanning control circuit 100 includes a plurality of initialization signal lines STV and a plurality of scanning control sub-circuits 110. Each scanning control sub-circuit 110 corresponds to a display area A.

The scanning control sub-circuit 110 includes at least one scanning control unit 111, each scanning control unit 111 is coupled to an initialization signal line STV, and different scanning control units 111 are coupled to different initialization signal lines STV. The scanning control unit 111 is configured to be turned on under control of an initialization signal from the initialization signal line STV to drive a corresponding display area A to display an image, and to be turned off under control of another initialization signal from the initialization signal line STV to drive the corresponding display area A not to display an image.

It can be seen that, each scanning control sub-circuit 110 corresponds to a single display area A, and the scanning control unit(s) 111 in each scanning control sub-circuit 110 may be individually turned on under control of the initialization signal from the initialization signal line STV, so as to drive the corresponding display area A to display an image in, or may be individually turned off under control of the another initialization signal from the initialization signal line STV, so as to drive the corresponding display area A not to display an image. Based on this, in a case where the scanning control circuit 100 is applied to the display panel 20 having the plurality of display areas A, when a target display area of the display panel 20 does not need to display an image, an initialization signal line STV coupled to a scanning control sub-circuit 110 corresponding to the target display area may be controlled to provide a first initialization signal for the scanning control sub-circuit 110, so that the scanning control sub-circuit 110 is turned off. Therefore, the problem that rows of sub-pixels P in the display area not for displaying an image are still be scanned and charged row by row is solved, and in turn, the waste of refresh time and the power consumption are reduced.

Moreover, initialization signal lines STV coupled to scanning control sub-circuits 110 corresponding to other display areas A may be controlled to provide second initialization signals to the scanning control sub-circuits 110, so that the scanning control sub-circuits 110 are turned on and drive the other display areas A display images normally. In addition, compared with the related art, in a case where any display area A of the display panel 20 displays an image, the number of corresponding refreshed rows is reduced, the refresh frequency is high, the charging time is prolonged, and the display effect is good.

It will be noted that, the target display area may be selected according to actual situations, which is not limited in the present disclosure.

In some embodiments, as shown in FIGS. 2 and 4, the display panel 20 includes Q display areas A, and the scanning control circuit 100 includes Q scanning control sub-circuits 110 and 2Q initialization signal lines STV. Q is greater than or equal to 2 ($Q \geq 2$), and Q is an integer. Each scanning control sub-circuit 110 includes a gate scanning control unit 112 and a light-emitting scanning control unit 113. The gate scanning control unit 112 is used to provide gate scanning signals for pixel driving circuits 200, and the light-emitting scanning control unit 113 is used to provide light-emitting scanning signals for the pixel driving circuits 200. For example, as shown in FIGS. 2 and 4, Q is equal to 2 ($Q=2$).

Q initialization signal lines STV of the 2Q initialization signal lines STV are gate initialization signal lines GSTV, each gate scanning control unit 112 is coupled to a gate initialization signal line GSTV, and each gate scanning control unit 112 is turned on or off under control of a gate initialization signal provided by the gate initialization signal line GSTV coupled thereto; another Q initialization signal lines STV of the 2Q initialization signal lines STV are light-emitting initialization signal lines ESTV, each light-emitting scanning control unit 113 is coupled to a light-emitting initialization signal line ESTV, and each light-emitting scanning control unit 113 is turned on or off under control of a light-emitting initialization signal provided by the light-emitting initialization signal line ESTV coupled thereto.

For example, referring to FIGS. 2 and 4, the display panel 20 includes two display areas A, the scanning control circuit 100 includes two scanning control sub-circuits 110 and four initialization signal lines STV, and each scanning control sub-circuit 110 includes a gate scanning control unit 112 and a light-emitting scanning control unit 113. The gate scanning control unit 112 is coupled to a gate initialization signal line GSTV, and the light-emitting scanning control unit 113 is coupled to a light-emitting initialization signal line ESTV.

In some embodiments, referring to FIG. 2, the gate scanning control unit 112 and the light-emitting scanning control unit 113 in the same scanning control sub-circuit 110 are arranged side by side along the first direction X, and Q display areas A are arranged side by side along the second direction Y. The first direction X is substantially perpendicular to the second direction Y. Gate scanning control units 112 in the scanning control sub-circuits 110 are arranged side by side along the second direction Y, and light-emitting scanning control units 113 in the scanning control sub-circuits 110 are arranged side by side along the second direction Y. With such arrangement, the gate scanning control units 112 and the light-emitting scanning control units 113 are arranged regularly, which facilitates the wiring arrangement and reduces an area occupied by the scanning control circuit 100.

Figure 12:
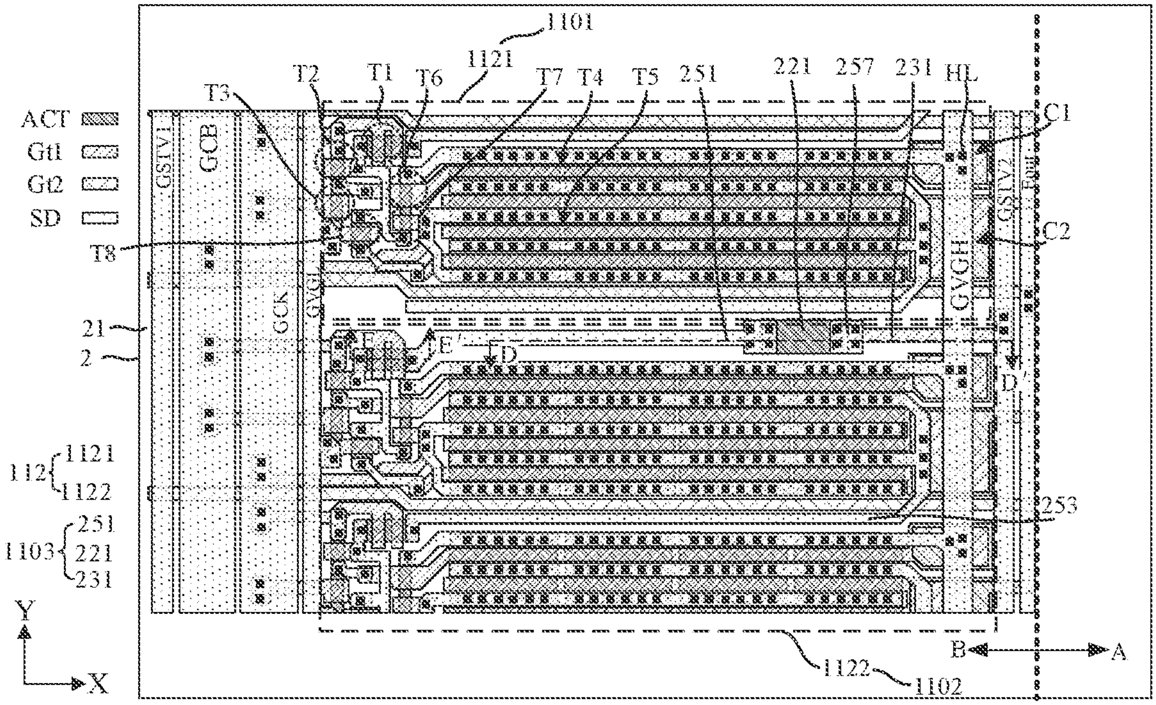
FIG. 12 is a top view of some layers of a gate scanning control unit, in accordance with yet some other embodiments.
Figure 17:
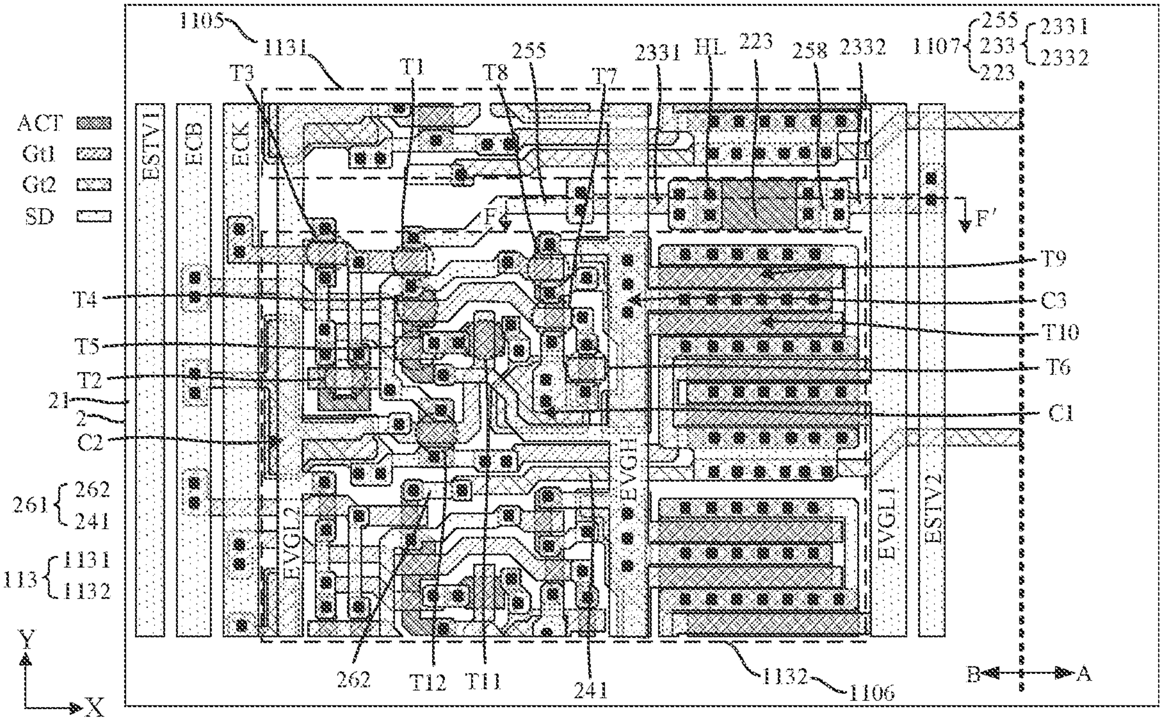
FIG. 17 is a top view of some layers of a light-emitting scanning control unit, in accordance with yet some other embodiments.

On this basis, referring to FIG. 4, in a case where the display panel 20 includes two display areas A, the four initialization signal lines STV include two gate initialization signal lines GSTV and two light-emitting initialization signal lines ESTV. As shown in FIG. 12, the two gate initialization signal lines GSTV (GSTV1 and GSTV2 in FIG. 12) extend along the second direction Y, and are arranged on two opposite sides of the gate scanning control unit 112 respectively. As shown in FIG. 17, the two light-emitting initialization signal lines ESTV (ESTV1 and ESTV2 in FIG. 17) extend along the second direction Y, and are arranged on two opposite sides of the light-emitting scanning control unit 113 respectively.

In some embodiments, as shown in FIG. 2, in each scanning control sub-circuit 110, the gate scanning control unit 112 is closer to the corresponding display area A than the light-emitting scanning control unit 113. In this case, the gate scanning signal lines GL coupled to the gate scanning control unit 112 are short and have low loads, which is beneficial to improving the stability of the gate scanning signals provided by the gate scanning signal lines GL to the pixel driving circuits 200.

In some embodiments, referring to FIG. 3, the scanning control unit 111 includes a plurality of shift registers RS that are connected in cascade and arranged side by side along the second direction Y, and first S-stage shift registers RS in the plurality of shift registers RS are coupled to a initialization signal line STV, where S is greater than or equal to 1 ($S \geq 1$), and S is an integer. For example, as shown in FIG. 3, S is equal to 1 ($S=1$).

For example, as shown in FIGS. 3, 5 and 7, S is equal to 1 ($S=1$). A signal input terminal IPUT of a first-stage shift register RS1 is coupled to an initialization signal line STV, and in every two adjacent shift registers RS in the scanning control unit 111, a signal input terminal IPUT of a next-stage shift register RS is coupled to an output terminal OPUT of a current-stage shift register RS.

It will be noted that, in the embodiments of the present disclosure, manners of the shift registers RS connected in cascade in the scanning control unit 111 are not limited thereto.

In some embodiments, as shown in FIGS. 3 and 4, the scanning control unit 111 is a gate scanning control unit 112, and the gate scanning control unit 112 includes a plurality of gate shift registers GRS that are connected in cascade, and first S gate shift registers GRS are coupled to a gate initialization signal line GSTV. For example, as shown in FIG. 4, S is equal to 1 ($S=1$).

In some embodiments, as shown in FIGS. 3 and 4, the scanning control unit 111 is a light-emitting scanning control unit 113, and the light-emitting scanning control unit 113 includes a plurality of light-emitting shift registers ERS that are connected in cascade, and first S light-emitting shift registers ERS are coupled to a light-emitting initialization signal line ESTV. For example, as shown in FIG. 4, S is equal to 1 ($S=1$).

In combination of FIGS. 5 and 12, the circuit of the gate shift register GRS will be schematically described by taking an example in which the gate shift register GRS includes seven transistors and two capacitors. In the following description, the gate shift register GRS may be any one of the plurality of gate shift registers included in the gate scanning control unit 112.

It will be noted that, herein, a first gate clock signal terminal and subsequent first gate clock signal lines use a same symbol "GCK", a second gate clock signal terminal and subsequent second gate clock signal lines use a same symbol "GCB", a first gate voltage signal terminal and subsequent first gate voltage signal lines use a same symbol "GVGL", and a second gate voltage signal terminal and subsequent second gate voltage signal lines use a same symbol "GVGH", which are merely for convenience of description and do not represent that they are same components or signals.

As shown in FIG. 5, the gate shift register GRS includes a first transistor T1, a second transistor T2, a third transistor T3, a fourth transistor T4, a fifth transistor T5, a sixth transistor T6, a seventh transistor T7, an eighth transistors T8, a first capacitor C1, and a second capacitor C2.

A control electrode of the first transistor T1 is coupled to a first gate clock signal terminal GCK, a first electrode of the first transistor T1 is coupled to a signal terminal IPUT, and a second electrode of the first transistor T1 is coupled to a first node N1.

A control electrode of the second transistor T2 is coupled to the first node N1, a first electrode of the second transistor T2 is coupled to the first gate clock signal terminal GCK, and a second electrode of the second transistor T2 is coupled to a second node N2.

A control electrode of the third transistor T3 is coupled to the first gate clock signal terminal GCK, a first electrode of the third transistor T3 is coupled to a first gate voltage signal terminal GVGL, and a second electrode of the third transistor T3 is coupled to the second node N2.

A control electrode of the fourth transistor T4 is coupled to the second node N2, a first electrode of the fourth transistor T4 is coupled to a second gate voltage signal terminal GVGH and a first electrode plate of the first capacitor C1, and a second electrode of the fourth transistor T4 is coupled to an output terminal OPUT.

A control electrode of the fifth transistor T5 is coupled to a third node N3, a first electrode of the fifth transistor T5 is coupled to a second gate clock signal terminal GCB, and a second electrode of the fifth transistor T5 is coupled to the output terminal OPUT and a first electrode plate of the second storage capacitor C2.

A control electrode of the sixth transistor T6 is coupled to the second node N2, a first electrode of the sixth transistor T6 is coupled to the second gate voltage signal terminal GVGH, and a second electrode of the sixth transistor T6 is coupled to a fourth node N4.

A control electrode of the seventh transistor T7 is coupled to the second gate clock signal terminal GCB, a first electrode of the seventh transistor T7 is coupled to the fourth node N4, and a second electrode of the seventh transistor T7 is coupled to the first node N1.

A control electrode of the eighth transistor T8 is coupled to the first gate voltage signal terminal GVGL, a first electrode of the eighth transistor T8 is coupled to the first node N1, and a second electrode of the eighth transistor T8 is coupled to the third node N3.

The first electrode plate of the first capacitor C1 is coupled to the first electrode of the fourth transistor T4 and the second gate voltage signal terminal GVGH, and a second electrode plate of the first capacitor C1 is coupled to the second node N2.

The first electrode plate of the second capacitor C2 is coupled to the second electrode of the fifth transistor T5, and the second electrode plate of the second capacitor C2 is coupled to the third node N3.

It will be noted that, in the plurality of gate shift registers GRS that are connected in cascade, in a case where S gate shift registers GRS are as a group for cascade connection, for adjacent two groups of S gate shift registers GRS, first gate clock signal terminals GCK of a current group of gate shift registers GRS and second gate clock signal terminals GCB of a next group of gate shift registers GRS are coupled to a same gate clock signal line; second gate clock signal terminals GCB of the current group of gate shift registers GRS and first gate clock signal terminals GCK of the next group of gate shift registers GRS are coupled to a same gate clock signal line. For example, the first gate clock signal terminals GCK of the current group of gate shift registers GRS are coupled to a first gate clock signal line GCK, and the second gate clock signal terminals GCB of the current group of gate shift registers GRS are coupled to a second gate clock signal line GCB. The first gate clock signal terminals GCK of the next group of gate shift registers GRS are coupled to the second gate clock signal line GCB, and the second gate clock signal terminals GCB of the next group of gate shift registers GRS are coupled to the first gate clock signal line GCK.

It will be noted that, in the circuit shown in FIG. 5, the nodes N1, N2 and N3 do not represent actual components, but represent junction points of related electrical connections in the circuit diagram. That is, these nodes are equivalent to the junction points of related electrical connections in the circuit diagram.

As shown in FIGS. 9 to 12, the circuit of the gate shift register GRS is formed by etching and stacking required pattern film layers layer by layer, so as to finally form each transistor in the equivalent circuit shown in FIG. 5.

Figure 9:
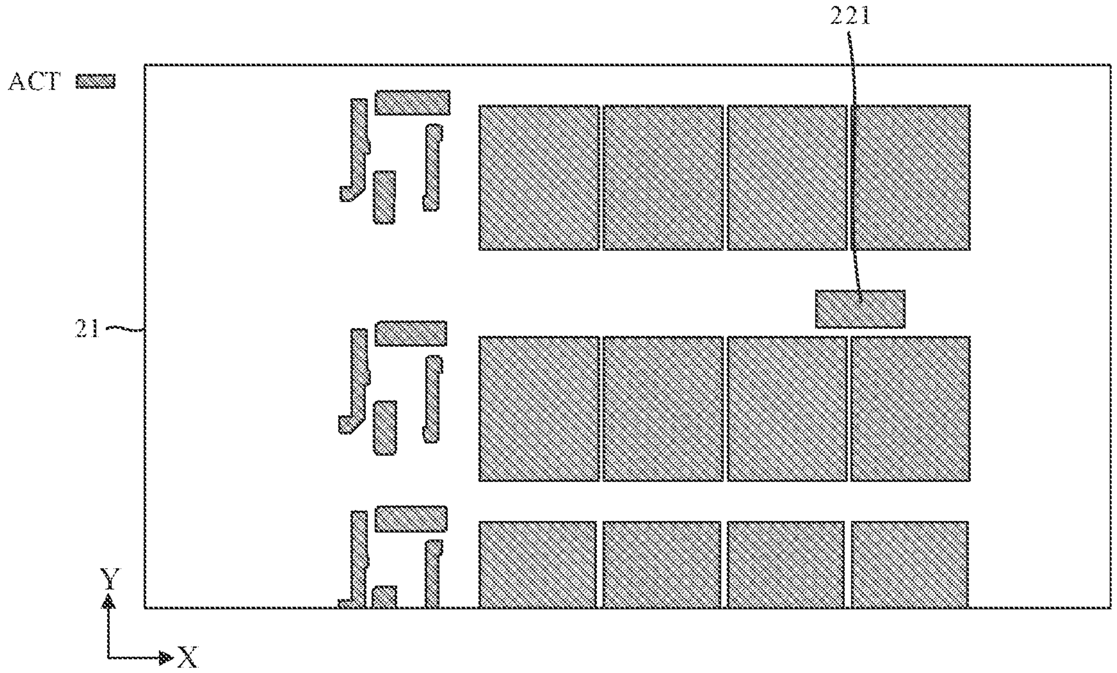
FIG. 9 is a top view of some layers of a gate scanning control unit, in accordance with some embodiments.

As shown in FIG. 9, a semiconductor layer ACT is formed first. A material of the semiconductor layer ACT includes amorphous silicon, single crystal silicon, polycrystalline silicon, or a metal oxide semiconductor material. For example, the material of the semiconductor layer ACT includes indium gallium zinc oxide (IGZO) or zinc oxide (ZnO), and the present disclosure is not limited thereto. The semiconductor layer ACT includes an active layer 225 (with reference to FIGS. 12 and 21) of each transistor in the equivalent circuit shown in FIG. 5.

Figure 10:
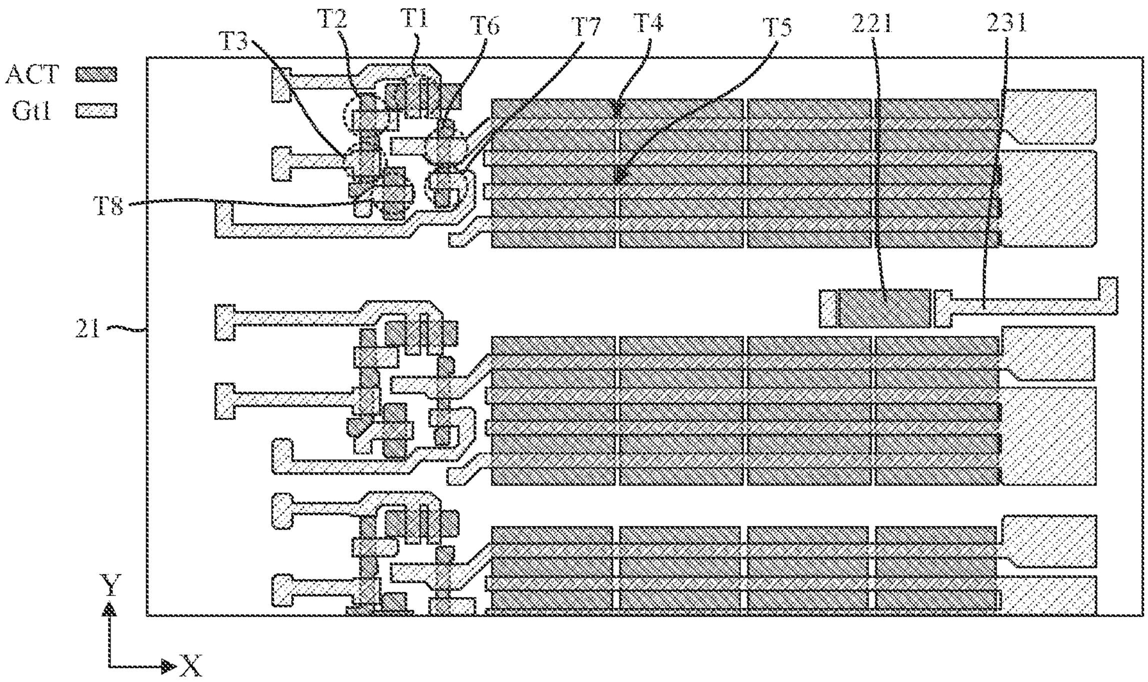
FIG. 10 is a top view of some layers of a gate scanning control unit, in accordance with some other embodiments.

As shown in FIG. 10, a first gate conductive layer Gt1 is formed on the semiconductor layer ACT, and overlapping portions of the first gate conductive layer Gt1 and the semiconductor layer ACT constitute the first transistor T1, the second transistor T2, the third transistor T3, the fourth transistor T4, the fifth transistor T5, the sixth transistor T6, the seventh transistor T7 and the eighth transistor T8. A material of the first gate conductive layer Gt1 includes a conductive metal. For example, the material of the first gate conductive layer Gt1 includes at least one of aluminum, copper, or molybdenum, and the present disclosure is not limited thereto. The first gate conductive layer Gt1 includes the gates 235 (with reference to FIGS. 12 and 21) of the transistor and the first electrode plates of the capacitors in the equivalent circuit shown in FIG. 5.

In some embodiments, a first gate insulating layer GI1 (with reference to FIGS. 19 and 21) is provided between the semiconductor layer ACT and the first gate conductive layer Gt1, and the first gate insulating layer GI1 is used to electrically insulate the semiconductor layer ACT and the first gate conductive layer Gt1. A material of the first gate insulating layer GI1 includes any of inorganic insulating materials of silicon nitride, silicon oxynitride and silicon oxide. For example, the material of the first gate insulating layer GI1 includes silicon dioxide, and the present disclosure is not limited thereto.

Figure 11:
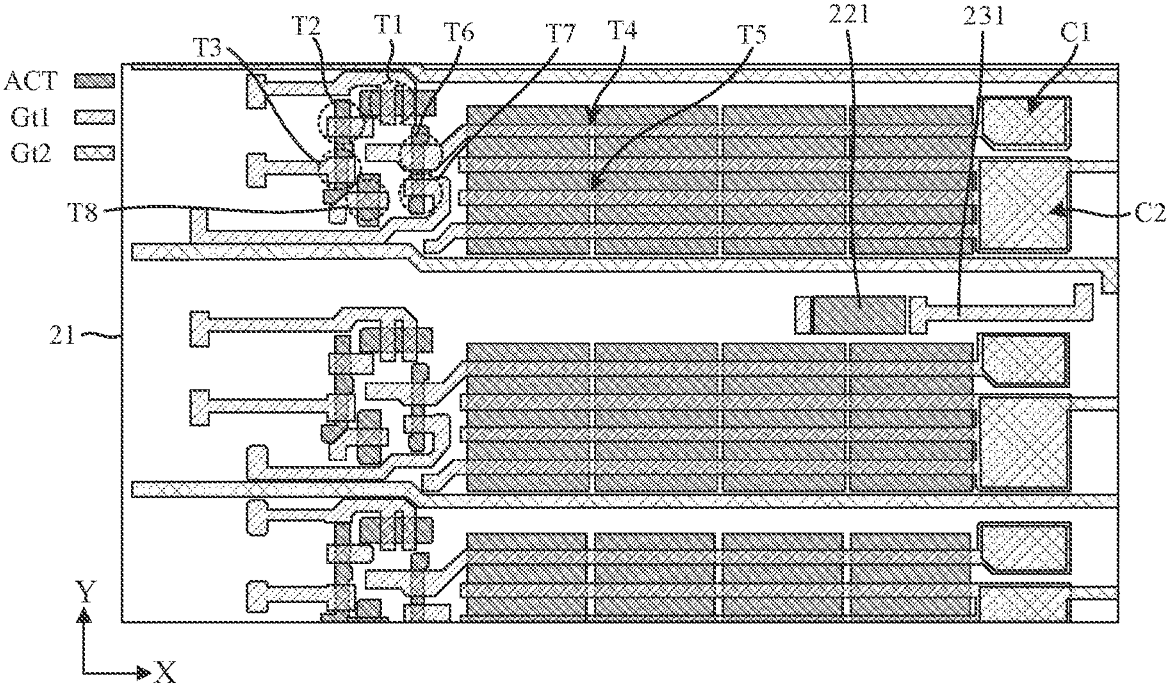
FIG. 11 is a top view of some layers of a gate scanning control unit, in accordance with yet some other embodiments.

As shown in FIG. 11, a second gate conductive layer Gt2 is formed on the first gate conductive layer Gt1, and overlapping portions of the second gate conductive layer Gt2 and the first gate conductive layer Gt1 constitute the first capacitor C1 and the second capacitor C2. A material of the second gate conductive layer Gt2 includes a conductive metal. For example, the material of the second gate conductive layer Gt2 includes at least one of aluminum, copper, or molybdenum, and the present disclosure is not limited thereto. The second gate conductive layer Gt2 includes the second electrode plate of the capacitor in the equivalent circuit shown in FIG. 5.

In some embodiments, a second gate insulating layer GI2 (with reference to FIG. 19) is provided between the first gate conductive layer Gt1 and the second gate conductive layer Gt2. A material of the second gate insulating layer GI2 includes any of inorganic insulating materials of silicon nitride, silicon oxynitride and silicon oxide. For example, the material of the second gate insulating layer GI2 includes silicon dioxide, and the present disclosure is not limited thereto.

As shown in FIG. 12, a source-drain conductive layer SD is formed on the second gate conductive layer Gt2, and the source-drain conductive layer SD includes a gate initialization signal line GSTV, a first gate voltage signal line GVGL, a second gate voltage signal line GVGH, a first gate clock signal line GCK and a second gate clock signal line GCB. A material of the source-drain conductive layer SD includes a conductive metal. For example, the material of the source-drain conductive layer SD includes at least one of aluminum, copper, or molybdenum, and the present disclosure is not limited thereto. The source-drain conductive layer SD includes the signal lines coupled to the equivalent circuit shown in FIG. 5.

Figure 19:
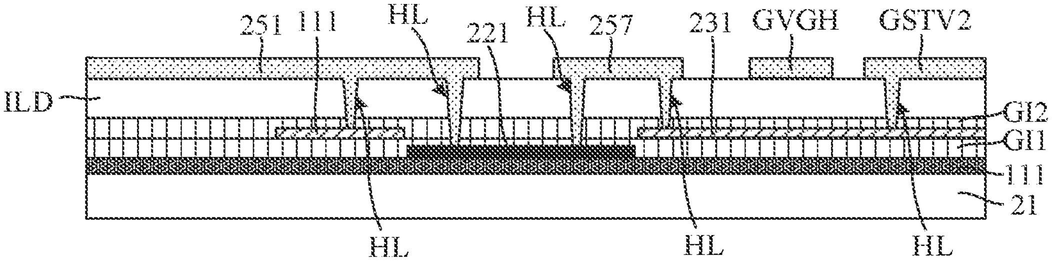
FIG. 19 is a sectional view of layers in FIG. 12 taken along the section line DD'.

It will be noted that, referring to FIGS. 12 and 19, electrical connections between the signal lines, transistors and capacitors are all transferred to the source-drain conductive layer SD through via holes HL, so that the electrical connections are realized through the source-drain conductive layer SD. For example, in a case where the first gate conductive layer Gt1 is electrically connected to the source-drain conductive layer SD, via holes HL for electrically connecting the first gate conductive layer Gt1 to the source-drain conductive layer SD penetrate through an interlayer dielectric layer ILD and the second gate insulating layer GI2. For another example, in a case where the semiconductor layer ACT is electrically connected to the source-drain conductive layer SD, via holes HL for electrically connecting the semiconductor layer ACT to the source-drain conductive layer SD penetrate through the interlayer dielectric layer ILD, the first gate insulating layer GI1 and the second gate insulating layer GI2.

In some embodiments, the interlayer dielectric layer ILD (referring to FIG. 19) is disposed between the source-drain conductive layer SD and the second gate conductive layer Gt2. A material of the interlayer dielectric layer ILD includes any of inorganic insulating materials of silicon nitride, silicon oxynitride and silicon oxide. For example, the material of the second gate insulating layer GI2 includes silicon dioxide, and the present disclosure is not limited thereto.

Figure 6:
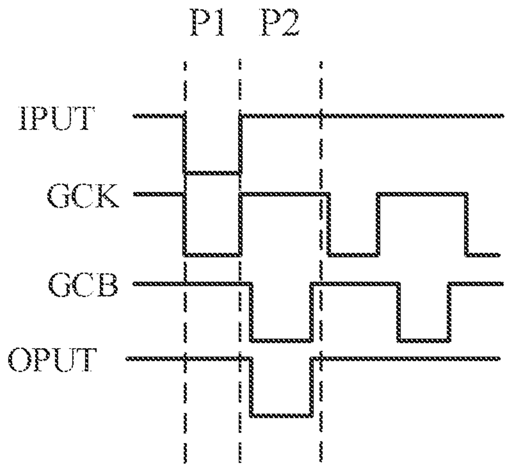
FIG. 6 is a driving timing diagram of the gate shift register shown in FIG. 5.

FIG. 6 is a timing diagram of the gate shift register GRS shown in FIG. 5. An input phase P1 and an output phase P2 of the gate shift register GRS will be described in detail below by taking an example in which the transistors are P-type transistors, which will not limit the protection of the present disclosure.

A "low voltage" can cause a P-type transistor to be turned on, but cannot cause an N-type transistor to be turned on (i.e., the N-type transistor being turned off). A "high voltage" can cause an N-type transistor to be turned on, but cannot cause a P-type transistor to be turned on (i.e., the P-type transistor being turned off).

It will be noted that the embodiments of the present disclosure include but are not limited thereto. For example, one or more thin film transistors in the circuit of the gate shift register GRS in the embodiments of the present disclosure may be N-type transistors, and as long as connections of respective electrodes of a thin film transistor of a selected type are correspondingly referred to respective electrodes of a corresponding thin film transistor in the embodiments of the present disclosure, and a corresponding voltage terminal provides a corresponding high or low voltage.

For example, in the following description, "0" represents a low voltage, and "1" represents a high voltage.

In the input phase P1, referring to FIG. 6, IPUT=0, GCK=0, GCB=1, and OPUT=1.

In this case, the first transistor T1, the second transistor T2, the third transistor T3, the fourth transistor T4, the fifth transistor T5, the sixth transistor T6, and the eighth transistor T8 are all turned on, the seventh transistor T7 is turned off, and the output terminal OPUT outputs a high-voltage gate scanning signal to control a gate signal terminal of a corresponding pixel driving circuit 200 to be turned off.

In the output phase P2, referring to FIG. 6, IPUT=1, GCK=1, GCB=0, OPUT=0.

In this case, the second transistor T2, the fifth transistor T5, the seventh transistor T7, and the eighth transistor T8 are all turned on, and the first transistor T1, the third transistor T3, the fourth transistor T4, and the sixth transistor T6 are all turned off, and the output terminal OPUT outputs a low-voltage gate scanning signal to control the gate signal terminal of the corresponding pixel driving circuit 200 to be turned on.

With combination of FIGS. 7 and 17, the circuit of the light-emitting shift register ERS will be schematically described below by taking an example in which the light-emitting shift register ERS includes twelve transistors and three capacitors. In the following description, the light-emitting shift register ERS may be any of the plurality of light-emitting shift registers that are connected in cascade included in the light-emitting scanning control unit 113.

It will be noted that, herein, a first light-emitting clock signal terminal and subsequent first light-emitting clock signal lines use a same symbol "ECK", a second light-emitting clock signal terminal and subsequent second light-emitting clock signal lines use a same symbol "ECB", a first light-emitting voltage signal terminal and subsequent first light-emitting voltage signal lines use a same symbol "EVGL", and a second light-emitting voltage signal terminal and subsequent second light-emitting voltage signal lines use a same symbol "EVGH", which are merely for convenience of description and do not represent that they are same components or signals.

As shown in FIG. 7, the light-emitting shift register ERS includes a first transistor T1, a second transistor T2, a third transistor T3, a fourth transistor T4, a fifth transistor T5. a sixth transistor T6, a seventh transistor T7, an eighth transistor T8, a ninth transistor T9, a tenth transistor T10. an eleventh transistor T11, a twelfth transistor T12, a first capacitor C1, a second capacitor C2, and a third capacitor C3.

A control electrode of the first transistor T1 is coupled to the first light-emitting clock signal terminal ECK, a first electrode of the first transistor T1 is coupled to the signal input terminal IPUT, and a second electrode of the first transistor T1 is coupled to a fourth node N4.

A control electrode of the second transistor T2 is coupled to the fourth node N4, a first electrode of the second transistor T2 is coupled to the first light-emitting clock signal terminal ECK, and a second electrode of the second transistor T2 is coupled to a fifth node N5.

A control electrode of the third transistor T3 is coupled to the first light-emitting clock signal terminal ECK, a first electrode of the third transistor T3 is coupled to a first light-emitting voltage signal terminal EVGL, and a second electrode of the third transistor T3 is coupled to the fifth node N5.

A control electrode of the fourth transistor T4 is coupled to a second light-emitting clock signal terminal ECB, a first electrode of the fourth transistor T4 is coupled to a sixth node N6, and a second electrode of the fourth transistor T4 is coupled to the fourth node N4.

A control electrode of the fifth transistor T5 is coupled to the fifth node N5, a first electrode of the fifth transistor T5 is coupled to a second light-emitting voltage signal terminal EVGH, and a second electrode of the fifth transistor T5 is coupled to the sixth node N6.

A control electrode of the sixth transistor T6 is coupled to a seventh node N7, a first electrode of the sixth transistor T6 is coupled to the second light-emitting clock signal terminal ECB, and a second electrode of the sixth transistor T6 is coupled to an eighth node N8.

A control electrode of the seventh transistor T7 is coupled to the second light-emitting clock signal terminal ECB, a first electrode of the seventh transistor T7 is coupled to the eighth node N8, and a second electrode of the seventh transistor T7 is coupled to a ninth node N9.

A control electrode of the eighth transistor T8 is coupled to the fourth node N4, a first electrode of the eighth transistor T8 is coupled to the second light-emitting voltage signal terminal EVGH, and a second electrode of the eighth transistor T8 is coupled to the ninth node N9.

A control electrode of the ninth transistor T9 is coupled to the ninth node N9, a first electrode of the ninth transistor T9 is coupled to the second light-emitting voltage signal terminal EVGH and a first electrode plate of the third capacitor C3, and a second electrode of the ninth transistor T9 is coupled to the output terminal OPUT.

A control electrode of the tenth transistor T10 is coupled to a tenth node N10, a first electrode of the tenth transistor T10 is coupled to the first light-emitting voltage signal terminal EVGL, and a second electrode of the tenth transistor T10 is coupled to the output terminal OPUT.

A control electrode of the eleventh transistor T11 is coupled to the first light-emitting voltage signal terminal EVGL, a first electrode of the eleventh transistor T11 is coupled to the fifth node N5, and a second electrode of the eleventh transistor T11 is coupled to the seventh node N7.

A control electrode of the twelfth transistor T12 is coupled to the first light-emitting voltage signal terminal EVGL, a first electrode of the twelfth transistor T12 is coupled to the fourth node N4, and a second electrode of the twelfth transistor T12 is coupled to the tenth node N10.

A first electrode plate of the first capacitor C1 is coupled to the seventh node N7, and a second plate of the first capacitor C1 is coupled to the eighth node N8.

A first electrode plate of the second capacitor C2 is coupled to the second light-emitting clock signal terminal ECB, and a second electrode plate of the second capacitor C2 is coupled to the tenth node N10.

The first electrode plate of the third capacitor C3 is coupled to the first electrode of the ninth transistor T9 and the second light-emitting voltage signal terminal EVGH, and a second electrode plate of the third capacitor C3 is coupled to the ninth node N9.

It will be noted that, in the plurality light-emitting shift registers ERS that are connected in cascade, in a case where S light-emitting shift registers ERS are as a group for cascade connection, for adjacent two groups of S light-emitting shift registers ERS, first light-emitting clock signal terminals ECK of a current group of light-emitting shift registers and second light-emitting clock signal terminals ECB of a next group of light-emitting shift registers ERS are coupled to a same light-emitting clock signal line; second light-emitting clock signal lines ECB of the current group of light-emitting shift registers ERS and first light-emitting clock signal terminals ECK of the next group of light-emitting shift registers ERS are coupled to a same light-emitting clock signal line. For example, the first light-emitting clock signal terminals ECK of the current group of light-emitting shift registers ERS are coupled to a first light-emitting clock signal line ECK, and the second light-emitting clock signal terminals ECB of the current group of light-emitting shift registers ERS are coupled to a second light-emitting clock signal line ECB. The first light-emitting clock signal terminals ECK of the next group of light-emitting shift registers ERS are coupled to the second light-emitting clock signal line ECB, and the second light-emitting clock signal terminals ECB of the next group of light-emitting shift registers ERS are coupled to the first light-emitting clock signal line ECK.

It will be noted that, in the circuit shown in FIG. 7, the nodes N4, N5, N6, N7, N8, N9 and N10 do not represent actual components, but represent junction points of relevant electrical connections in the circuit diagram. That is, these nodes are equivalent to the junction points of the relevant electrical connections in the circuit diagram.

As shown in FIGS. 14 to 17, a circuit of the light-emitting shift register ERS is formed by etching and stacking required pattern film layers layer by layer, so as to finally form each transistor in the equivalent circuit shown in FIG. 7.

Figure 14:
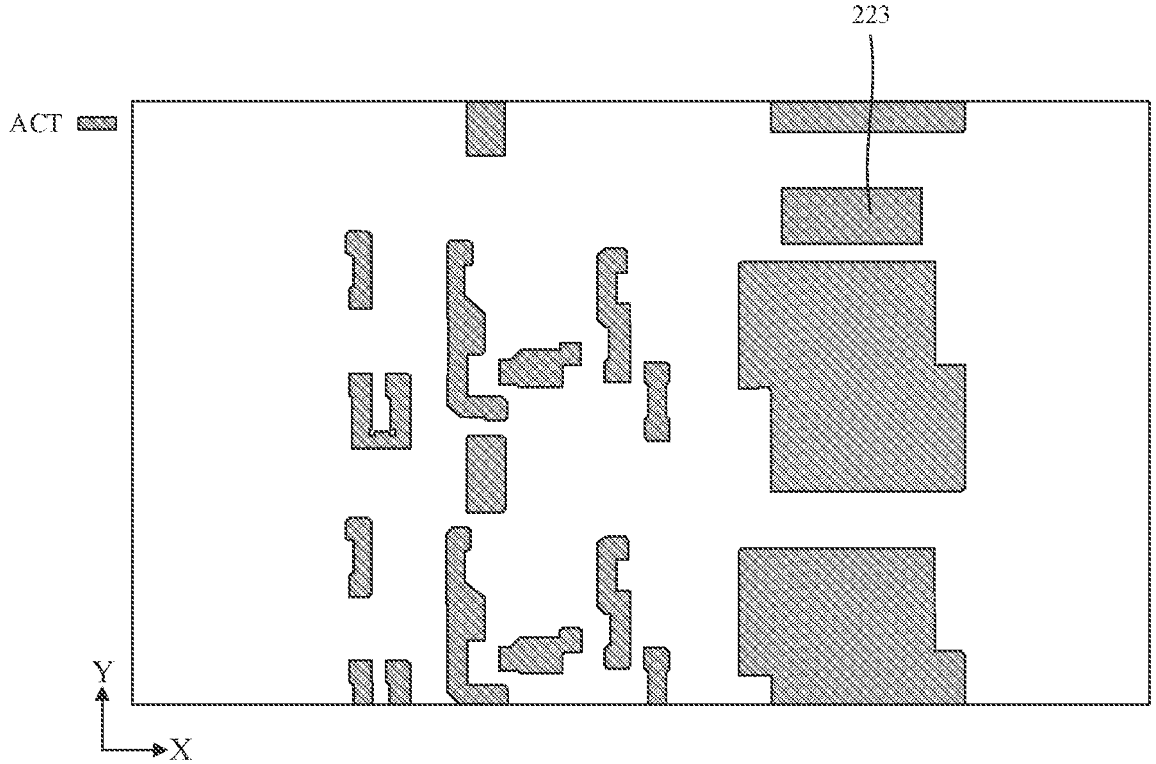
FIG. 14 is a top view of some layers of a light-emitting scanning control unit, in accordance with some embodiments.

As shown in FIG. 14, the semiconductor layer ACT is formed first. Portions of the light-emitting shift register ERS and the gate shift register GRS that are located in the semiconductor layer ACT may be made of the same material, and may be formed in the same layer. The semiconductor layer ACT further includes an active layer 225 (with reference to FIGS. 17 and 21) of each transistor in the equivalent circuit shown in FIG. 7.

Figure 15:
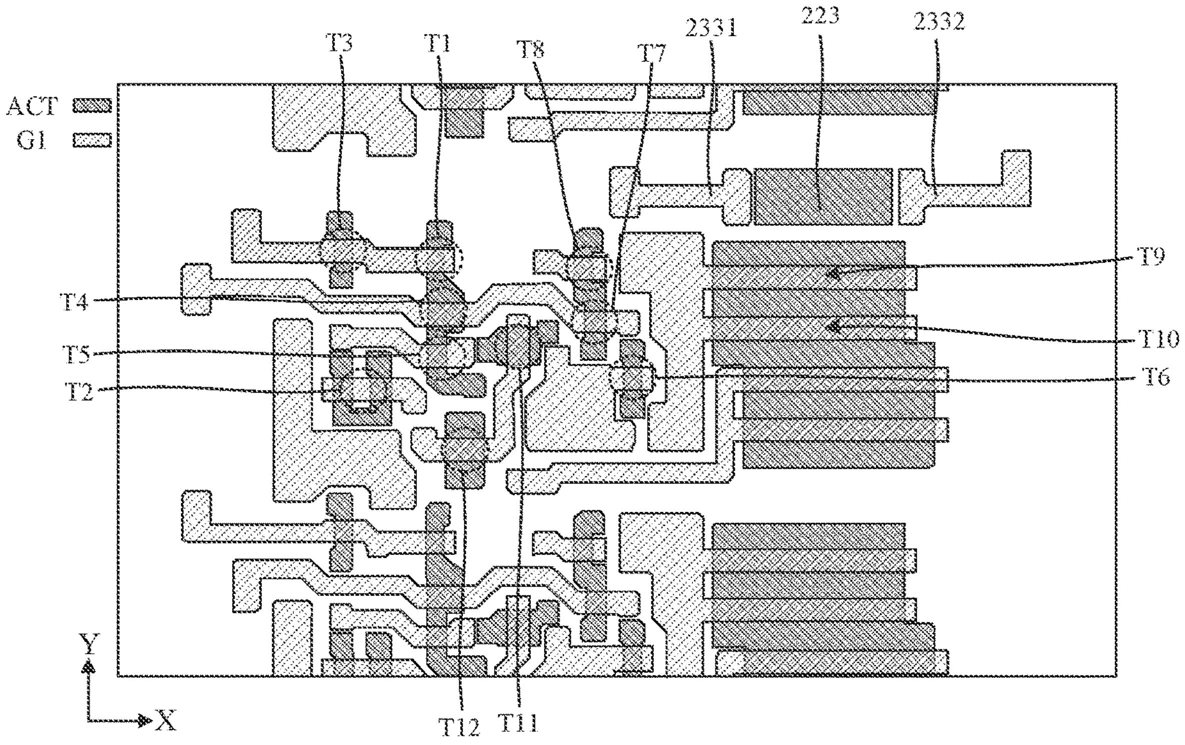
FIG. 15 is a top view of some layers of a light-emitting scanning control unit, in accordance with some other embodiments.

As shown in FIG. 15, the first gate conductive layer Gt1 is formed on the semiconductor layer ACT, and overlapping portions of the first gate conductive layer Gt1 and the semiconductor layer ACT constitute the first transistor T1, the second transistor T2, the third transistor T3, the fourth transistor T4, the fifth transistor T5, the sixth transistor T6, the seventh transistor T7, the eighth transistor T8, the ninth transistor T9, the tenth transistor T10, the eleventh transistor T11 and the twelfth transistor T12. Portions of the light-emitting shift register ERS and the gate shift register GRS that are located in the first gate conductive layer Gt1 may be made of the same material, and may be formed in the same layer. The first gate conductive layer Gt1 further includes the gates 235 (with reference to FIGS. 17 and 21) of the transistors and the first electrode plates of the capacitors in the equivalent circuit shown in FIG. 7.

In some embodiments, the first gate insulating layer Gl1 (with reference to FIG. 20) is provided between the semiconductor layer ACT and the first gate conductive layer Gt1. Portions of the light-emitting shift register ERS and the gate shift register GRS that are located in the first gate insulating layer Gl1 may be made of the same material, and may be formed in the same layer.

Figure 16:
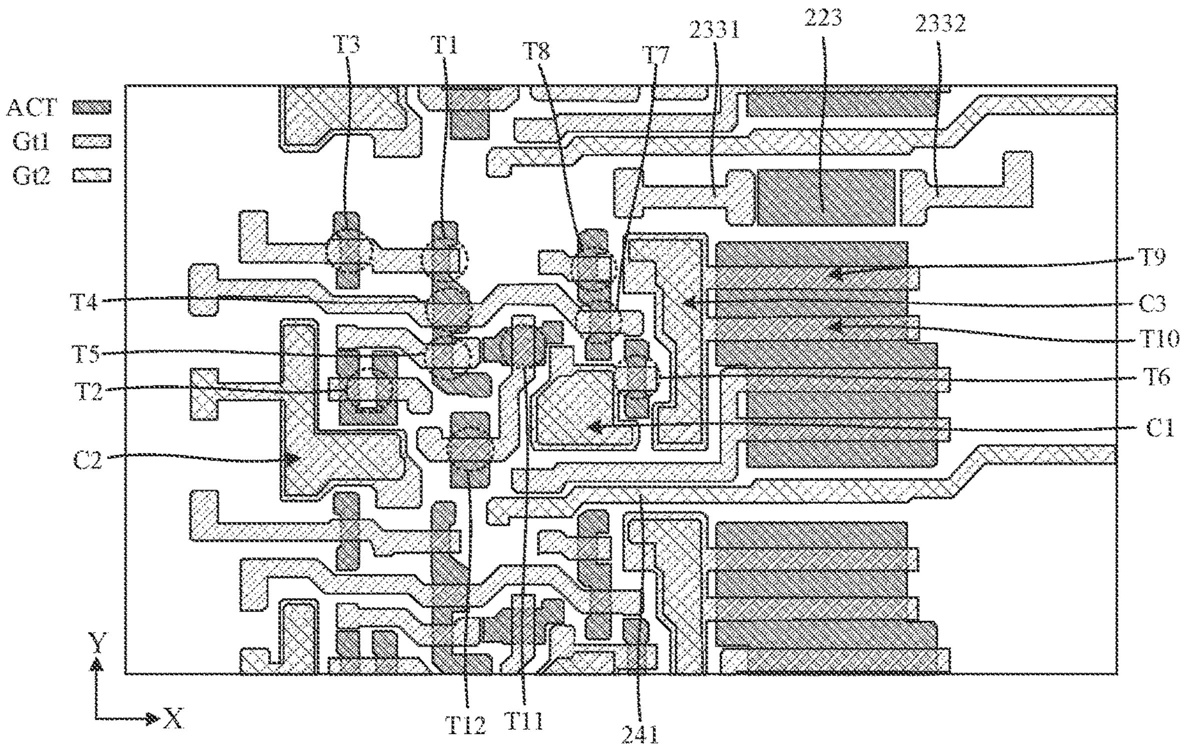
FIG. 16 is a top view of some layers of a light-emitting scanning control unit, in accordance with yet some other embodiments.

As shown in FIG. 16, the second gate conductive layer Gt2 is formed on the first gate conductive layer Gt1, and overlapping portions of the second gate conductive layer Gt2 and the first gate conductive layer Gt1 constitute the first capacitor C1, the second capacitor C2 and the third capacitor C3. Portions of the light-emitting shift register ERS and the gate shift register GRS that are located in the second gate conductive layer Gt2 may be made of the same material, and may be formed in the same layer. The second gate conductive layer Gt2 further includes the second electrode plates of the capacitors in the equivalent circuit shown in FIG. 7 (see FIG. 17).

In some embodiments, the second gate insulating layer Gl2 (with reference to FIG. 20) is provided between the first gate conductive layer Gt1 and the second gate conductive layer Gt2. The second gate insulating layer Gl2 of the light-emitting shift register ERS and the second gate insulating layer Gl2 of the gate shift register GRS may be made of the same material, and may be formed in the same layer.

As shown in FIG. 17, the source-drain conductive layer SD is formed on the second gate conductive layer Gt2, and the source-drain conductive layer SD further includes a second light-emitting initialization signal line ESTV2, a first light-emitting voltage signal sub-line EVGL1, a second light-emitting voltage signal line EVGH, a second light-emitting voltage signal sub-line EVGL2, a first light-emitting clock signal line ECK, a second light-emitting clock signal line ECB, and a first light-emitting initialization signal line ESTV1. The source-drain conductive layer SD of the light-emitting shift register ERS and the source-drain conductive layer SD of the gate shift register GRS may be made of the same material, and may be formed in the same layer. The source-drain conductive layer SD further includes the signal lines coupled to the equivalent circuit shown in FIG. 7.

Figure 20:
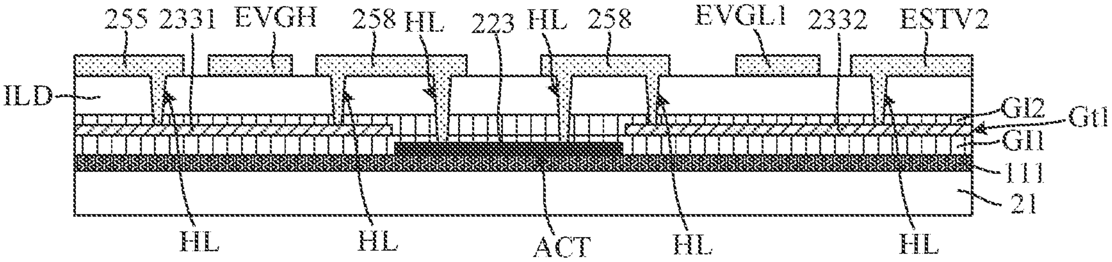
FIG. 20 is a sectional view of layers in FIG. 17 taken along the section line FF'.

It will be noted that, referring to FIGS. 17 and 20, electrical connections between the signal lines, transistors and capacitors are all transferred to the source-drain conductive layer SD through via voles HL, so that the electrical connections are realized through the source-drain conductive layer SD. For example, in a case where the first gate conductive layer Gt1 is electrically connected to the source-drain conductive layer SD, via holes HL for electrically connecting the first gate conductive layer Gt1 to the source-drain conductive layer SD penetrate through an interlayer dielectric layer ILD and the second gate insulating layer Gl2. For another example, in a case where the semiconductor layer ACT is electrically connected to the source-drain conductive layer SD, via holes HL for electrically connecting the semiconductor layer ACT to the source-drain conductive layer SD penetrate through the interlayer dielectric layer ILD, the first gate insulating layer Gl1 and the second gate insulating layer Gl2.

In some embodiments, the interlayer dielectric layer ILD (with reference to FIG. 20) is disposed between the source-drain conductive layer SD and the second gate conductive layer Gt2. The interlayer dielectric layer ILD of the light-emitting shift register ERS and the interlayer dielectric layer ILD of the gate shift register GRS may be made of the same material, and may be formed in the same layer.

Figure 8:
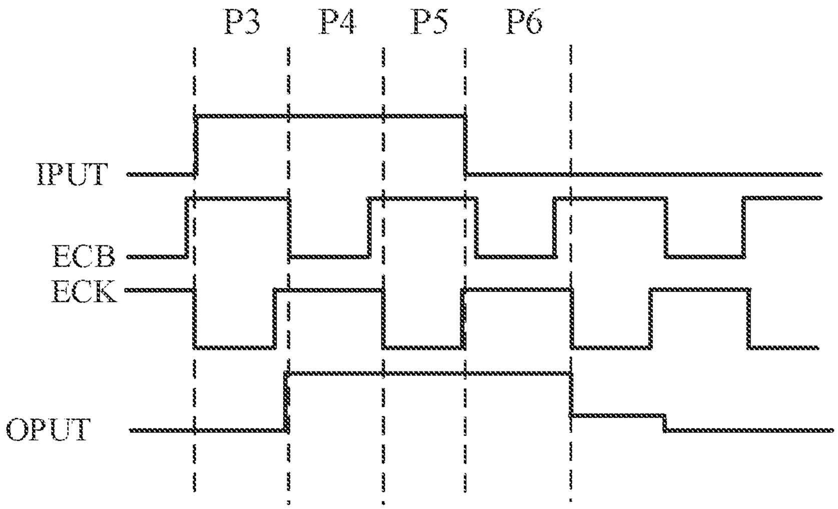
FIG. 8 is a driving timing diagram of the light-emitting scanning control shift register shown in FIG. 7.

FIG. 8 is a timing diagram of the light-emitting shift register ERS shown in FIG. 7. The input phases P3 to P5 and the output phases P4 to P6 of the light-emitting shift register ERS are described in detail below by taking an example in which the transistors are P-type transistors, which will not limit the protection scope of the present disclosure.

It will be noted that the embodiments of the present disclosure include but are not limited thereto. For example, one or more thin film transistors in the circuit of the light-emitting shift register ERS in the embodiments of the present disclosure may be N-type transistors, and as long as connections of respective electrodes of a thin film transistor of a selected type are correspondingly referred to respective electrodes of a corresponding thin film transistor in the embodiments of the present disclosure, and a corresponding voltage terminal provides a corresponding high or low voltage.

A “low voltage” can cause a P-type transistor to be turned on, but cannot cause an N-type transistor to be turned on (i.e., the N-type transistor being turned off). A “high voltage” can cause an N-type transistor to be turned on, but cannot cause a P-type transistor to be turned on (i.e., the P-type transistor being turned off).

For example, in the following description, “0” represents a low voltage, and “1” represents a high voltage.

Referring to FIGS. 7 and 8, the input phases P3 to P5 are described as follows.

In the input phase P3, IPUT=1, ECK=0, ECB=1, OPUT=0.

In this case, the first transistor T1, the third transistor T3, the fifth transistor T5, the sixth transistor T6, the eleventh transistor T11 and the twelfth transistor T12 are all turned on, the second transistor T2, the fourth transistor T4, the seventh transistor T7, the eighth transistor T8, the ninth transistor T9 and the tenth transistor T10 are all turned off, the output terminal OPUT outputs no signal, and a light-emitting scanning signal received by an enable signal terminal of a corresponding pixel driving circuit 200 is a low-voltage light-emitting scanning signal stored by a capacitor connected between the light-emitting shift register ERS and the pixel driving circuit 200 in a previous frame, so that the enable signal terminal of the corresponding pixel driving circuit 200 is controlled to be turned off.

In the input phase P4, IPUT=1, ECK=1, ECB=0, OPUT=1.

In this case, the fourth transistor T4, the fifth transistor T5, the sixth transistor T6, the seventh transistor T7, the ninth transistor T9, the eleventh transistor T11 and the twelfth transistor T12 are all turned on, the first transistor T1, the second transistor T2, the third transistor T3, the eighth transistor T8 and the tenth transistor T10 are all turned off, and the output terminal OPUT outputs a high-voltage light-emitting scanning signal, so as to control the enable signal terminal of the corresponding pixel driving circuit 200 to be turned on.

In the input phase P5, IPUT=1, ECK=0, ECB=1, OPUT=1.

In this case, the first transistor T1, the third transistor T3, the fifth transistor T5, the sixth transistor T6, the ninth transistor T9, the eleventh transistor T11 and the twelfth transistor T12 are all turned on, the second transistor T2, the fourth transistor T4, the seventh transistor T7, the eighth transistor T8 and the tenth transistor T10 are all turned off, and the output terminal OPUT outputs a high-voltage light-emitting scanning signal, so as to control the enable signal terminal of the corresponding pixel driving circuit 200 to be turned on.

Referring to FIGS. 7 and 8, the output phases P4 to P6 are described as follows.

In the output phase P4, IPUT=1, ECK=1, ECB=0, OPUT=1.

In this case, the fourth transistor T4, the fifth transistor T5, the sixth transistor T6, the seventh transistor T7, the ninth transistor T9, the eleventh transistor T11 and the twelfth transistor T12 are all turned on, the first transistor T1, the second transistor T2, the third transistor T3, the eighth transistor T8 and the tenth transistor T10 are all turned off, and the output terminal OPUT outputs a high-voltage light-emitting scanning signal, so as to control the enable signal terminal of the corresponding pixel driving circuit 200 to be turned on.

In the output phase P5, IPUT=1, ECK=0, ECB=1, OPUT=1.

In this case, the first transistor T1, the third transistor T3, the fifth transistor T5, the sixth transistor T6, the ninth transistor T9, the eleventh transistor T11 and the twelfth transistor T12 are all turned on, the second transistor T2, the fourth transistor T4, the seventh transistor T7, the eighth transistor T8 and the tenth transistor T10 are all turned off, and the output terminal OPUT outputs a high-voltage light-emitting scanning signal, so as to control the enable signal terminal of the corresponding pixel driving circuit 200 to be turned on.

In the output phase P6, IPUT=0, ECK=1, ECB=0, OPUT=1.

In this case, the fourth transistor T4, the fifth transistor T5, the sixth transistor T6, the seventh transistor T7, the ninth transistor T9, the eleventh transistor T11 and the twelfth transistor T12 are all turned on, the first transistor T1, the second transistor T2, the third transistor T3, the eighth transistor T8 and the tenth transistor T10 are all turned off, and the output terminal OPUT outputs a high-voltage light-emitting scanning signal, so as to control the enable signal terminal of the corresponding pixel driving circuit 200 to be turned on.

It will be noted that, in the embodiments of the present disclosure, specific implementations of the gate shift register GRS and the light-emitting shift register ERS are not limited to the above description, and may be any used implementations, such as a conventional connection that is well known to those skilled in the art, as long as corresponding functions are guaranteed to be realized. The above examples do not limit the protection scope of the present disclosure.

Some embodiments of the present disclosure provide a display substrate 2. As shown in FIG. 2, the display substrate 2 includes a substrate 21 and at least one scanning control circuit 100 disposed on the substrate 21, and the scanning control circuit 100 is the scanning control circuit 100 in any of the above embodiments.

For example, referring to FIG. 4, the display substrate 2 includes two scanning control circuits 100, the two scanning control circuits 100 are disposed on two opposite edges of the substrate 21, and the two scanning control circuits 100 drive all pixel driving circuits 200 row by row from the two sides at the same time. That is, the two scanning control circuits 100 drive the pixel driving circuits 200 in a double-sided driving manner. Therefore, the load is reduced, and the display effect is improved.

In some embodiments, as shown in FIG. 2, each scanning control sub-circuit 110 of the scanning control circuit 100 includes a gate scanning control unit 112 and a light-emitting scanning control unit 113.

On this basis, referring to FIGS. 12 and 17, the scanning control sub-circuit 110 further includes a plurality of gate initialization signal lines GSTV, a first gate voltage signal line GVGL, a second gate voltage signal line GVGH, a first gate clock signal line GCK, and a second gate clock signal line GCB that are coupled to the gate scanning control unit 112, and a plurality of light-emitting initialization signal lines ESTV, at least one first light-emitting voltage signal line EVGL, a second light-emitting voltage signal line EVGH, a first light-emitting clock signal line ECK, and a second light-emitting clock signal line ECB that are coupled to the light-emitting scanning control unit 113.

The signal transmitted by the first gate clock signal line GCK and the signal transmitted by the second gate clock signal line GCB may be referred to the timing diagram of the above gate shift register GRS, which will not be repeated here in the present disclosure. The signal transmitted by the first light-emitting clock signal line ECK and the signal transmitted by the second light-emitting clock signal line ECB may be referred to the timing diagram of the above light-emitting shift register ERS, which will not be repeated here in the present disclosure.

It will be noted that, the first gate voltage signal line GVGL is configured to transmit a direct current (DC) operating level signal. For example, the first gate voltage signal line GVGL is configured to transmit a low level signal. The second gate voltage signal line GVGH is configured to transmit a DC non-operating level signal. For example, the second gate voltage signal line GVGH is configured to transmit a high level signal. Similarly, the first light-emitting voltage signal line EVGL is configured to transmit a DC operating level signal. For example, the first light-emitting voltage signal line EVGL is configured to transmit a low level signal. The second light-emitting voltage signal line EVGH is configured to transmit a DC non-operating level signal. For example, the second light-emitting voltage signal line EVGH is configured to transmit a high level signal.

In some embodiments, as shown in FIG. 4, the display substrate 2 has a first display area A1 and a second display area A2 that are arranged side by side along the second direction Y.

As shown in FIG. 4, the scanning control circuit 100 includes a first scanning control sub-circuit 1101 corresponding to the first display area A1, and a second scanning control sub-circuit 1102 corresponding to the second display area A2. The first scanning control sub-circuit 1101 includes a first gate scanning control unit 1121, and the second scanning control sub-circuit 1102 includes a second gate scanning control unit 1122.

As shown in FIG. 12, the plurality of gate initialization signal lines GSTV include a first gate initialization signal line GSTV1 and a second gate initialization signal line GSTV2, the first gate initialization signal line GSTV1 is coupled to the first gate scanning control unit 1121, and the second gate initialization signal line GSTV2 is coupled to the second gate scanning control unit 1122.

As shown in FIG. 12, along the first direction X and in a direction pointing from the inside to the outside of the display area A, the second gate initialization signal line GSTV2, the second gate voltage signal line GVGH, the first gate voltage signal line GVGL, the first gate clock signal line GCK, the second gate clock signal line GCB, and the first gate initialization signal line GSTV1 are arranged in sequence, and the first gate scanning control unit 1121 and the second gate scanning control unit 1122 are located between the second gate initialization signal line GSTV2 and the first gate voltage signal line GVGL.

It will be noted that, an orthogonal projection of the second gate voltage signal line GVGH on the substrate 21 may partially coincide with orthogonal projections of the first capacitor C1 and the second capacitor C2 in the gate shift register GRS on the substrate 21, and overlapping portions of the second gate voltage signal line GVGH and the first capacitor C1 in the gate shift register GRS may be directly electrically connected through via holes HL (with reference to FIG. 12), which is convenient for wiring arrangement.

In some embodiments, referring to FIGS. 2 and 12, in a case where the gate scanning control unit 112 is closer to the corresponding display area A than the light-emitting scanning control unit 113, the display panel 20 further includes a light-emitting test signal line Eout, and the light-emitting test signal line Eout extends along the second direction Y, and is located on a side of the second gate initialization signal line GSTV2 proximate to the display area A. The light-emitting test signal line Eout is configured to transmit a light-emitting test signal during a test phase, so as to determine whether there is a short circuit or open circuit problem.

In some embodiments, as shown in FIG. 4, the second gate scanning control unit 1122 includes a plurality of second gate shift registers that are connected in cascade and arranged side by side along the second direction Y. Each second gate shift register includes a second gate input transistor (i.e., the first transistor T1 mentioned in the above gate shift register).

On this basis, as shown in FIG. 12, the second scanning control sub-circuit 1102 further includes S second gate initial connection lines 1103, which respectively correspond to first S second gate shift registers. An end of each second gate initial connection line 1103 is coupled to the second gate initialization signal line GSTV2, and another end of each second gate initial connection line 1103 is coupled to a second gate input transistor in a corresponding second gate shift register (i.e., the first transistor T1 mentioned in the above gate shift register). Here, S is greater than or equal to 1 (S≥1), and S is an integer.

Figure 13:
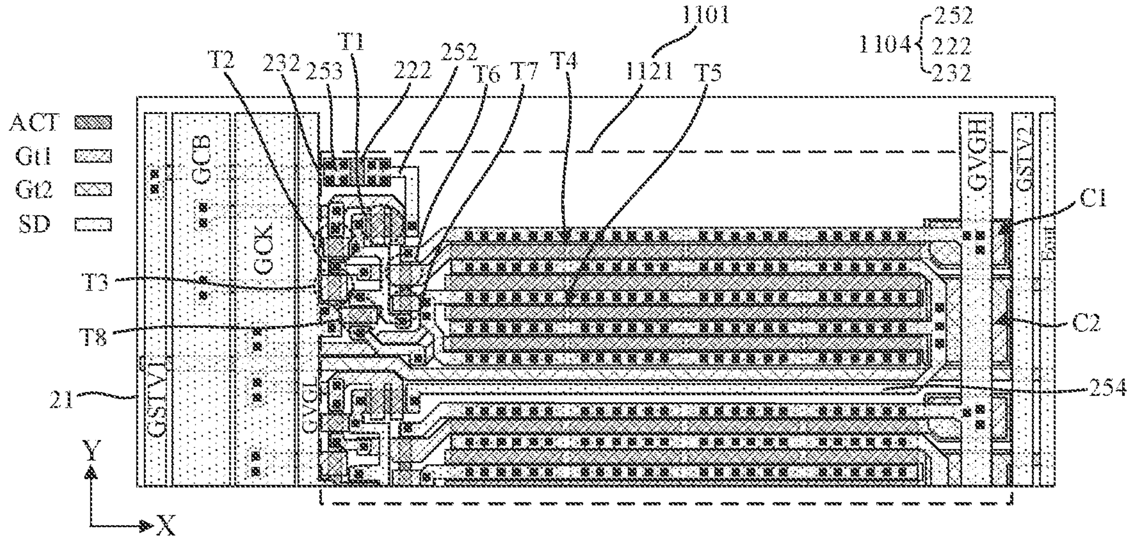
FIG. 13 is a top view of some layers of a gate scanning control unit, in accordance with yet some other embodiments.

In some embodiments, referring to FIGS. 4 and 13, the first gate scanning control unit 1121 includes a plurality of first gate shift registers that are connected in cascade and arranged side by side along the second direction Y. Each first gate shift register includes a first gate input transistor (i.e., the first transistor T1 mentioned in the above gate shift register).

On this basis, as shown in FIG. 13, the first gate scanning control unit 1121 further includes S first gate initial connection lines 1104, which respectively correspond to first S first gate shift registers. An end of each first gate initial connection line 1104 is coupled to the first gate initialization signal line GSTV1, and another end of each first gate initial connection line 1104 is coupled to a first gate input transistor in a corresponding first gate shift register (e.g., the first transistor T1 mentioned in the above gate shift register). Here, S is greater than or equal to 1 (S≥1), and S is an integer. For example, as shown in FIG. 13, S is equal to 1 (S=1).

In some embodiments, as shown in FIGS. 12 and 17. the display substrate 2 includes a semiconductor layer ACT, a first gate conductive layer Gt1, a second gate conductive layer Gt2 and a source-drain conductive layer SD that are sequentially disposed on the substrate 21.

Figure 21:
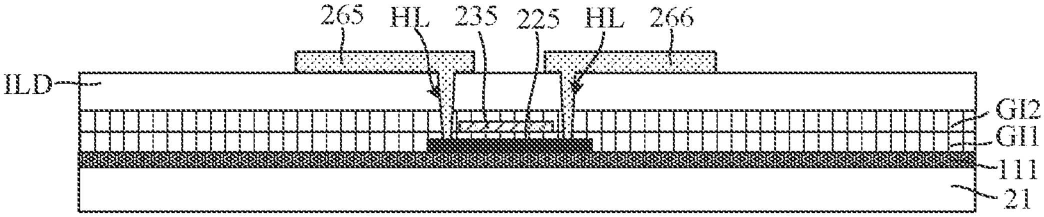
FIG. 21 is a sectional view of layers in FIG. 12 taken along the section line EE'.

Referring to FIGS. 12 and 21, the semiconductor layer ACT includes active layers 225 of the transistors in the scanning control circuit 100, the first gate conductive layer Gt1 includes gates 235 of the transistors in the scanning control circuit 100 and first electrode plates of the capacitors, and the second gate conductive layer Gt2 includes second electrode plates of the capacitors in the scanning control circuit 100. The source-drain conductive layer SD includes sources 265 and drains 266 of the transistors in the scanning control circuit 100 and signal lines in the scanning control circuit 100.

On this basis, as shown in FIGS. 12 and 19, the second gate initial connection line 1103 includes at least one first connection segment 251 and at least one second connection segment 221. The at least one first connection segment 251 is located in the source-drain conductive layer SD, and orthogonal projection(s) of the first connection segment(s) 251 on the substrate 21 are separated from an orthogonal projection of any signal line in the second scanning control sub-circuit 1102 on the substrate 21. The at least one second connection segment 221 is located in the semiconductor layer ACT, and orthogonal projection(s) of the second connection segment(s) 221 on the substrate 21 are separated from an orthogonal projection of any signal line in the second scanning control sub-circuit 1102 on the substrate 21. The resistivity of the second connection segment 221 is greater than the resistivity of the first connection segment 251, so as to reduce the risk of sudden change in the initialization signal provided by the second gate initialization signal line GSTV2 due to the static electricity generated during the process.

It will be noted that, the resistivity of the second connection segment 221 is greater than the resistivity of the first connection segment 251, which may be realized by the material of the semiconductor layer ACT and the material of the source-drain conductive layer SD. For example, the material of the semiconductor layer ACT includes at least one of low temperature polysilicon, monocrystalline silicon, or metal oxide, and the material of the source-drain conductive layer SD includes at least one of copper, aluminum, or silver.

In some embodiments, referring to FIG. 13, the first gate initial connection line 1104 includes at least one seventh connection segment 252 and at least one eighth connection segment 222. The at least one seventh connection segment 252 is located in the source-drain conductive layer SD, and orthogonal projection(s) of the seventh connection segment(s) 252 on the substrate 21 are separated from an orthogonal projection of any signal line in the first scanning control sub-circuit 1101 on the substrate 21. The at least one eighth connection segment 222 is located in the semiconductor layer ACT, and orthogonal projection(s) of the eighth connection segment(s) 222 on the substrate 21 are separated from an orthogonal projection of any signal line in the first scanning control sub-circuit 1101 on the substrate 21. The resistivity of the eighth connection segment 222 is greater than the resistivity of the seventh connection segment 252, so as to reduce the risk of sudden change in the initialization signal provided by the first gate initialization signal line GSTV1 due to the static electricity generated during the process.

In some embodiments, as shown in FIGS. 12 and 19, the second gate initial connection line 1103 further includes at least one third connection segment 231. The at least one third connection segment 231 is located in the first gate conductive layer Gt1 or the second gate conductive layer Gt2. Orthogonal projection(s) of the third connection segment(s) 231 on the substrate 21 intersect with an orthogonal projection of at least one of the second gate initialization signal line GSTV2 and the second gate voltage signal line GVGH on the substrate. It will be noted that, the at least one third connection segment 231 is located in the first gate conductive layer Gt1, and is far away from the source-drain conductive layer SD, so that a signal transmitted by the third connection segment 231 is less disturbed by parasitic capacitance. FIG. 12 illustrates an example in which the at least one third connection segment 231 is located in the first gate conductive layer Gt1.

For example, as shown in FIG. 12. the second gate initial connection line 1103 includes a first connection segment 251, a second connection segment 221 and a third connection segment 231 that are connected in sequence, and an orthogonal projection of the third connection segment 231 on the substrate 21 intersects with orthogonal projections of the second gate voltage signal line GVGH and the second gate initialization signal line GSTV2 on the substrate 21. An end of the first connection segment 251 away from the third connection segment 231 is coupled to a corresponding second gate input transistor (i.e., the first transistor T1 mentioned in the above gate shift register), and an end of the third connection segment 231 away from the first connection segment 251 is coupled to the second gate initialization signal line GSTV2.

In this case, the third connection segment 231 may be formed in the first gate conductive layer Gt1 or the second gate conductive layer Gt2. so that the second gate initial connection line 1103 may be electrically connected to the second gate initialization signal line GSTV2 across the second gate voltage signal line GVGH.

In some embodiments, referring to FIG. 13, the first gate initial connection line 1104 further includes at least one ninth connection segment 232. The at least one ninth connection segment 232 is located in the first gate conductive layer Gt1 or the second gate conductive layer Gt2, and orthogonal projection(s) of the ninth connection segment(s)

232 on the substrate 21 intersect with an orthogonal projection of at least one of the first gate initialization signal line GSTV1, the first gate clock signal line GCK and the second gate clock signal line GCB on the substrate 21. It will be noted that, the at least one ninth connection segment 232 is located in the first gate conductive layer Gt1, and is far away from the source-drain conductive layer SD, so that a signal transmitted by the ninth connection segment 232 is less disturbed by parasitic capacitance. FIG. 13 illustrates an example in which the at least one ninth connection segment 232 is located in the first gate conductive layer Gt1.

For example, the orthogonal projection(s) of the ninth connection segment(s) 232 on the substrate 21 intersect with orthogonal projections of the first gate initialization signal line GSTV1, the first gate clock signal line GCK and the second gate clock signal line GCB on the substrate 21. An end of the seventh connection segment 252 away from the ninth connection segment 232 is coupled to a corresponding first gate input transistor (i.e., the first transistor T1 mentioned in the above gate shift register), and an end of the ninth connection segment 232 away from the seventh connection segment 252 is coupled to the first gate initialization signal line GSTV1.

In this case, the ninth connection segment 232 may be formed in the first gate conductive layer Gt1 or the second gate conductive layer Gt2, so that the first gate initial connection line 1104 may be electrically connected to the first gate initialization signal line GSTV1 across the first gate clock signal line GCK and the second gate clock signal line GCB.

The connections of the connection segments included in the first gate initial connection line 1104 are realized through via holes HL, and the connections of the connection segments included in the second gate initial connection line 1103 are realized through via holes HL (see FIG. 19). In the process, the via hole HL is normally formed by etching or laser drilling from the source-drain conductive layer SD towards the substrate 21.

Based on this, in some embodiments, as shown in FIGS. 12 and 19, the second gate initial connection line 1103 includes a plurality of connection segments connected in sequence, the source-drain conductive layer SD further includes a plurality of first connection patterns 257. and each first connection pattern 257 electrically connects adjacent two connection segments of the second gate initial connection line 1103 through via holes HL.

In some embodiments, referring to FIG. 13, the first gate initial connection line 1104 includes a plurality of connection segments connected in sequence, the source-drain conductive layer SD further includes a plurality of third connection patterns 259, and each third connection pattern 259 electrically connects adjacent two connection segments of the first gate initial connection line 1104 through via holes HL (see FIG. 19).

In some embodiments, as shown in FIG. 12, the second gate initial connection line 1103 substantially extends along the first direction X. and is located between adjacent two stages of gate shift registers GRS.

As shown in FIG. 12, a second gate initial connection line 1103 corresponding to a first-stage second gate shift register in the second gate scanning control unit 1122 is located between a last-stage first gate shift register in the first gate scanning control unit 1121 and the first-stage second gate shift register in the second gate scanning control unit 1122.

If first S second gate shift registers in the second gate scanning control unit 1122 are coupled to the second gate initialization signal line GSTV2, except the first-stage second gate shift register, each second gate initial connection line 1103 of second gate initial connection lines 1103 corresponding to the remaining (S−1) second gate shift registers is located between two second gate shift registers adjacent to the second gate initial connection line 1103.

In some embodiments, the first gate initial connection line 1104 substantially extends along the first direction X. As shown in FIG. 13, a first gate initial connection line 1104 corresponding to a first-stage gate shift register in the first gate scanning control unit 1121 is located on a side of the first-stage gate shift register away from the last-stage first gate shift register in the first gate scanning control unit 1121.

If first S first gate shift registers in the first gate scanning control unit 1121 are coupled to the first gate initialization signal line GSTV1, except the first-stage first gate shift register, each first gate initial connection line 1104 of first gate initial connection lines 1104 corresponding to the remaining (S−1) first gate shift registers is located between two first gate shift registers adjacent to the first gate initial connection line 1104.

In some embodiments, as shown in FIG. 12, the second scanning control sub-circuit 1102 further includes a plurality of second gate connection lines 253, and the plurality of second gate connection lines 253 correspond to remaining second gate shift registers except the first S second gate shift registers, respectively. An end of each second gate connection line 253 is coupled to an output terminal OPUT of a previous second gate shift register, and another end of each second gate connection line 253 is coupled to a second gate input transistor in a corresponding second gate shift register. The plurality of second gate connection lines 253 may be located in the source-drain conductive layer SD.

In some embodiments, as shown in FIG. 13, the first scanning control sub-circuit 1101 further includes a plurality of first gate connection lines 254, and the plurality of first gate connection lines 254 correspond to remaining first gate shift registers except the first S first gate shift registers, respectively. An end of each first gate connection line 254 is coupled to the output terminal OPUT of a previous-stage first gate shift register, and another end of each first gate connection line 254 is coupled to a first gate input transistor in a corresponding first gate shift register. The plurality of first gate connection lines 254 may be located in the source-drain conductive layer SD.

In some embodiments, as shown in FIG. 4, the scanning control circuit 100 includes a first light-emitting control sub-circuit 1105 corresponding to the first display area A1, and a second light-emitting control sub-circuit 1106 corresponding to the second display area A2. The first light-emitting control sub-circuit 1105 includes a first light-emitting scanning control unit 1131, and the second light-emitting control sub-circuit 1106 includes a second light-emitting scanning control unit 1132.

Referring to FIGS. 4 and 17, the plurality of light-emitting initialization signal lines ESTV include a first light-emitting initialization signal line ESTV1 and a second light-emitting initialization signal line ESTV2, the first light-emitting initialization signal line ESTV1 is coupled to the first light-emitting scanning control unit 1131, and the second light-emitting initialization signal line ESTV2 is coupled to the second light-emitting scanning control unit 1132. The at least one first light-emitting voltage signal line EVGL includes a first light-emitting voltage signal sub-line EVGL1 and a second light-emitting voltage signal sub-line EVGL2.

As shown in FIG. 17, along the first direction X and in a direction pointing from the inside to the outside of the display area A (i.e., a direction opposite to the first direction X in FIG. 17), the second light-emitting initialization signal line ESTV2, the first light-emitting voltage signal sub-line EVGL1, the second light-emitting voltage signal line EVGH, the second light-emitting voltage signal sub-line EVGL2, the first light-emitting clock signal line ECK, the second light-emitting clock signal line ECB, and the first light-emitting initialization signal line ESTV1 are arranged in sequence, and the first light-emitting scanning control unit 1131 and the second light-emitting scanning control unit 1132 are located between the first light-emitting voltage signal sub-line EVGL1 and the first light-emitting clock signal line ECK.

It will be noted that, an orthogonal projection of the second light-emitting voltage signal sub-line EVGL2 on the substrate 21 may partially coincide with an orthogonal projection of the second capacitor C2 in the light-emitting shift register ERS on the substrate 21, thereby simplifying the wiring arrangement.

In addition, an orthogonal projection of the second light-emitting voltage signal line EVGH on the substrate 21 may partially coincide with an orthogonal projection of the third capacitor C3 in the light-emitting shift register ERS on the substrate 21, and overlapping portions of the second light-emitting voltage signal line EVGH and the third capacitor C3 in the light-emitting shift register ERS may be directly electrically connected through via hole(s) HL, thereby simplifying the wiring arrangement.

In some embodiments, as shown in FIG. 17, the second light-emitting scanning control unit 1132 includes a plurality of second light-emitting shift registers that are connected in cascade and arranged side by side along the second direction Y, and each second light-emitting shift register includes a second light-emitting input transistor (i.e., the first transistor T1 mentioned in the above light-emitting shift register).

On this basis, the second light-emitting control sub-circuit 1106 further includes S second light-emitting initial connection lines 1107, which correspond to first S second light-emitting shift registers, respectively. An end of each second light-emitting initial connection line 1107 is coupled to the second light-emitting initialization signal line ESTV2, and another end of each second light-emitting initial connection line 1107 is coupled to a second light-emitting input transistor in a corresponding second light-emitting shift register (i.e., the first transistor T1 mentioned in the above light-emitting shift register). Here, S is greater than or equal to 1 (S≥1), and S is an integer. For example, as shown in FIG. 17, S is equal to 1 (S=1).

In some embodiments, referring to FIG. 17, the first light-emitting scanning control unit 1131 includes a plurality of first light-emitting shift registers that are connected in cascade and arranged side by side along the second direction Y, and each first light-emitting shift register includes a first light-emitting input transistor (i.e., the first transistor T1 mentioned in the above light-emitting shift register).

Figure 18:
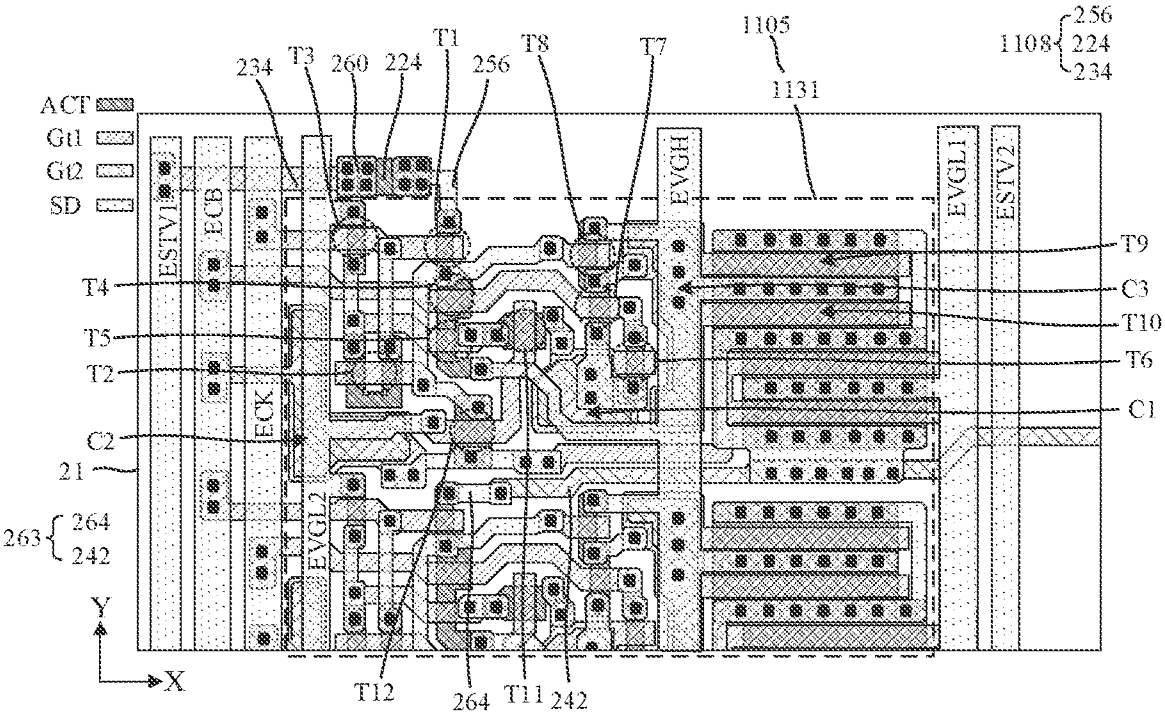
FIG. 18 is a top view of some layers of a light-emitting scanning control unit, in accordance with yet some other embodiments.

On this basis, as shown in FIG. 18, the first light-emitting scanning control unit 1131 further includes S first light-emitting initial connection lines 1108, which correspond to first S first light-emitting shift registers, respectively. An end of each first light-emitting initial connection line 1108 is coupled to the first light-emitting initialization signal line ESTV1, and another end of each first light-emitting initial connection line 1108 is coupled to a first light-emitting input transistor in a corresponding first light-emitting shift register (i.e., the first transistor T1 mentioned in the above light-emitting shift register). Here, S is greater than or equal to 1 (S≥1), and S is an integer.

In some embodiments, as shown in FIGS. 17 and 20, the second light-emitting initial connection line 1107 includes at least one fourth connection segment 255 and at least one fifth connection segment 223. The at least one fourth connection segment 255 is located in the source-drain conductive layer SD, and orthogonal projection(s) of the fourth connection segment(s) 255 on the substrate 21 are separated from an orthogonal projection of any signal line in the second light-emitting control sub-circuit 1106 on the substrate 21. The at least one fifth connection segment 223 is located in the semiconductor layer ACT, and orthogonal projection(s) of the fifth connection segment(s) 223 on the substrate 21 are separated from an orthogonal projection of any signal line in the second light-emitting control sub-circuit 1106 on the substrate 21. The resistivity of the fifth connection segment 223 is greater than the resistivity of the fourth connection segment 255, so as to reduce the risk of sudden change in the initialization signal provided by the second light-emitting initialization signal line ESTV2 due to the static electricity generated during the process.

It will be noted that, the resistivity of the fifth connection segment 223 is greater than the resistivity of the fourth connection segment 255, which may be realized by the material of the semiconductor layer ACT and the material of the source-drain conductive layer SD. For example, the material of the semiconductor layer ACT includes at least one of low temperature polysilicon, monocrystalline silicon, or metal oxide, and the material of the source-drain conductive layer SD includes at least one of copper, aluminum, or silver.

In some embodiments, referring to FIG. 18, the first light-emitting initial connection line 1108 includes at least one tenth connection segment 256 and at least one eleventh connection segment 224. The at least one tenth connection segment 256 is located in the source-drain conductive layer SD, and orthogonal projection(s) of the tenth connection segment(s) 256 on the substrate 21 are separated from an orthogonal projection of any signal line in the first scanning control sub-circuit 1101 on the substrate 21. The at least one eleventh connection segment 224 is located in the semiconductor layer ACT, and orthogonal projection(s) of the eleventh connection segment(s) 224 on the substrate 21 are separated from an orthogonal projection of any signal line in the first scanning control sub-circuit 1101 on the substrate 21. The resistivity of the eleventh connection segment 224 is greater than the resistivity of the tenth connection segment 256, so as to reduce the risk of sudden change in the initialization signal provided by the first light-emitting initialization signal line ESTV1 due to the static electricity generated during the process.

In some embodiments, as shown in FIGS. 17 and 20, the second light-emitting initial connection line 1107 further includes at least one sixth connection segment 233, the at least one sixth connection segment 233 is located in the first gate conductive layer Gt1 or the second gate conductive layer Gt2, and orthogonal projection(s) of the sixth connection segment(s) 233 on the substrate 21 intersect with an orthogonal projection of at least one of the second light-emitting initialization signal line ESTV2, the first light-emitting voltage signal sub-line EVGL1 and the second light-emitting voltage signal line EVGH on the substrate. It will be noted that, the at least one sixth connection segment 233 is located in the first gate conductive layer Gt1, and is far away from the source-drain conductive layer SD, so that a signal transmitted by the sixth connection segment 233 is less disturbed by parasitic capacitance. FIG. 17 illustrates an example in which the at least one sixth connection segment 233 is located in the first gate conductive layer Gt1.

For example, as shown in FIGS. 17 and 20, the second light-emitting initial connection line 1107 includes a fourth connection segment 255, a first sixth connection segment 2331, a fifth connection segment 223 and a second sixth connection segment 2332 that are connected in sequence. An orthogonal projection of the first sixth connection segment 2331 on the substrate 21 intersects with an orthogonal projection of the second light-emitting voltage signal line EVGH on the substrate 21. An orthogonal projection of the second sixth connection segment 2332 on the substrate 21 intersects with orthogonal projections of the first light-emitting voltage signal sub-line EVGL1 and the second light-emitting initialization signal line ESTV2 on the substrate 21. An end of the fourth connection segment 255 away from the second sixth connection segment 2332 is coupled to a corresponding second light-emitting input transistor (i.e., the first transistor T1 mentioned in the above light-emitting shift register), and an end of the second sixth connection segment 2332 away from the fourth connection segment 255 is coupled to the second light-emitting initialization signal line ESTV2.

In this case, two sixth connection segments 233 may be formed in the first gate conductive layer Gt1 or the second gate conductive layer Gt2, so that the second gate initial connection line 1103 may be electrically connected to the second light-emitting initialization signal line ESTV2 across the second light-emitting voltage signal line EVGH and the first light-emitting voltage signal sub-line EVGL1.

In some embodiments, referring to FIG. 18, the first light-emitting initial connection line 1108 further includes at least one twelfth connection segment 234. The at least one twelfth connection segment 234 is located in the first gate conductive layer Gt1 or the second gate conductive layer Gt2, and orthogonal projection(s) of the twelfth connection segment(s) 234 on the substrate 21 intersect with an orthogonal projection of at least one of the first light-emitting initialization signal line ESTV1, the first light-emitting clock signal line ECK, the second light-emitting clock signal line ECB and the second light-emitting voltage signal sub-line EVGL2 on the substrate 21. It will be noted that, the at least one twelfth connection segment 234 is located in the first gate conductive layer Gt1, and is far away from the source-drain conductive layer SD, so that a signal transmitted by the twelfth connection segment 234 is less disturbed by parasitic capacitance. FIG. 18 illustrates an example in which the at least one twelfth connection segment 234 is located in the first gate conductive layer Gt1.

For example, as shown in FIG. 18, the orthogonal projection of the twelfth connection segment 234 on the substrate 21 intersects with orthogonal projections of all the first light-emitting initialization signal line ESTV1. the first light-emitting clock signal line ECK, the second light-emitting clock signal line ECB, and the second light-emitting voltage signal sub-line EVGL2 on the substrate 21. An end of the tenth connection segment 256 away from the twelfth connection segment 234 is coupled to a corresponding first light-emitting input transistor (i.e., the first transistor T1 mentioned in the above light-emitting shift register), and an end of the twelfth connection segment 234 away from the tenth connection segment 256 is coupled to the first light-emitting initialization signal line ESTV1.

In this case, the twelfth connection segment 234 may be formed in the first gate conductive layer Gt1 or the second gate conductive layer Gt2, so that the first light-emitting initial connection line 1108 may be electrically connected to the first light-emitting initialization signal line ESTV1 across the second light-emitting voltage signal sub-line EVGL2, the first light-emitting clock signal line ECK and the second light-emitting clock signal line ECB.

The connections of the connection segments included in the first light-emitting initial connection line 1108 are realized through via holes HL, and the connections of the connection segments included in the second light-emitting initial connection line 1107 are realized through via holes HL (with reference to FIG. 20). In the process, the via hole HL is normally formed by etching or laser drilling from the source-drain conductive layer SD towards the substrate 21.

Based on this, in some embodiments, as shown in FIGS. 17 and 20, the second light-emitting initial connection line 1107 includes the connection segments connected in sequence, and the source-drain conductive layer SD includes a plurality of second connection patterns 258, and each second connection pattern 258 is electrically connected to adjacent two connection segments of the second light-emitting initial connection line 1107 through via holes HL.

In some embodiments, as shown in FIG. 18, the first light-emitting initial connection line 1108 includes the connection segments connected in sequence, the source-drain conductive layer SD includes a plurality of fourth connection patterns 260, and each fourth connection pattern 260 is electrically connected to adjacent two connection segments of the first light-emitting initial connection line 1108 through via holes HL (see FIG. 20).

In some embodiments, referring to FIG. 17, the second light-emitting initial connection line 1107 substantially extends along the first direction X, and is located between adjacent two light-emitting shift registers ERS.

A second light-emitting initial connection line 1107 corresponding to a first-stage second light-emitting shift register in the second light-emitting scanning control unit 1132 is located between a last-stage first light-emitting shift register in the first light-emitting scanning control unit 1131 and the first-stage second light-emitting shift register in the second light-emitting scanning control unit 1132.

If first S second light-emitting shift registers in the second light-emitting scanning control unit 1132 are coupled to the second light-emitting initialization signal line ESTV2, except the first-stage second light-emitting shift register, each second light-emitting initial connection line 1107 of second light-emitting initial connection lines 1107 corresponding to the remaining (S−1) second light-emitting shift registers is located between two second light-emitting shift registers adjacent to the second light-emitting initial connection line 1107.

In some embodiments, referring to FIG. 18, the first light-emitting initial connection line 1108 substantially extends along the first direction X. A first light-emitting initial connection line 1108 corresponding to a first-stage light-emitting shift register in the first light-emitting scanning control unit 1131 is located on a side of the first-stage light-emitting shift register away from the last-stage first light-emitting shift register in the first light-emitting scanning control unit 1131.

If first S first light-emitting shift registers in the first light-emitting scanning control unit 1131 are coupled to the first light-emitting initialization signal line ESTV1, except the first-stage first light-emitting shift register, each first light-emitting initial connection line 1108 of first light-emitting initial connection lines 1108 corresponding to the remaining (S−1) first light-emitting shift registers is located between two first light-emitting shift registers adjacent to the first light-emitting initial connection line 1108.

In some embodiments, referring to FIG. 7, the second scanning control sub-circuit 1102 further includes a plurality of second light-emitting connection lines 261, which correspond to remaining second light-emitting shift registers except the first S second light-emitting shift registers. An end of each second light-emitting connection line 261 is coupled to an output terminal OPUT of a previous-stage second light-emitting shift register, and another end of each second light-emitting connection line 261 is coupled to a second light-emitting input transistor in a corresponding second light-emitting shift register.

As shown in FIG. 17, the second light-emitting connection line 261 may include at least one thirteenth connection segment 262 and at least one fourteenth connection segment 241. The thirteenth connection segment(s) 262 are located in the source-drain conductive layer SD, and orthogonal projection(s) of the thirteenth connection segment(s) 262 on the substrate 21 are separated from an orthogonal projection of any signal line in the second scanning control sub-circuit 1102 on the substrate 21. The fourteenth connection segment(s) 241 are located on the first gate conductive layer Gt1 or the second gate conductive layer Gt2, and orthogonal projection(s) of the fourteenth connection segment(s) 241 on the substrate 21 intersect with an orthogonal projection of the second light-emitting voltage signal line EVGH on the substrate 21 and orthogonal projections of the signal lines coupled to the gate scanning control unit 112 on the substrate 21. FIG. 17 illustrates an example in which the fourteenth connection segment(s) 241 are located in the second gate conductive layer Gt2.

In addition, an end of the thirteenth connecting segment 262 away from the fourteenth connection segment 241 is coupled to the second light-emitting input transistor in the corresponding second light-emitting shift register, and the fourteenth connection segment 241 is coupled to the output terminal OPUT of the previous-stage second light-emitting shift register.

It will be noted that, the fourteenth connection segment 241 is further electrically connected to the pixel driving circuit across the gate scanning control unit.

In some embodiments, referring to FIG. 18, the first scanning control sub-circuit 1101 further includes a plurality of first light-emitting connection lines 263, and the plurality of first light-emitting connection lines 263 correspond to remaining first light-emitting shift registers except the first S first light-emitting shift registers. An end of each first light-emitting connection line 263 is coupled to an output terminal OPUT of a previous-stage first light-emitting shift register, and another end of each first light-emitting connection line 263 is coupled to a first light-emitting input transistor in a corresponding first light-emitting shift register.

As shown in FIG. 18, the second light-emitting connection line 263 may include at least one fifteenth connection segment 264 and at least one sixteenth connection segment 242. The fifteenth connection segment(s) 264 are located in the source-drain conductive layer SD, and orthogonal projection(s) of the fifteenth connection segment(s) 264 on the substrate 21 are separated from an orthogonal projection of any signal line in the second scanning control sub-circuit 1101 on the substrate 21. The sixteenth connection segment(s) 242 are located in the first gate conductive layer Gt1 or the second gate conductive layer Gt2, and orthogonal projection(s) of the sixteenth connection segment(s) 242 on the substrate 21 intersect with an orthogonal projection of the second light-emitting voltage signal line EVGH on the substrate 21 and the orthogonal projections of the signal lines coupled to the gate scanning control unit 112 on the substrate 21. FIG. 18 illustrates an example in which the sixteenth connection segment(s) 242 are located in the second gate conductive layer Gt2.

In addition, an end of the fifteenth connecting segment 264 away from the sixteenth connecting segment 242 is coupled to the first light-emitting input transistor in the corresponding first light-emitting shift register, and the sixteenth connecting segment 242 is coupled to the output terminal OPUT of the previous-stage first light-emitting shift register.

It will be noted that, the sixteenth connection segment 242 is further electrically connected to corresponding pixel driving circuits 200 across the gate scanning control unit 112.

Some embodiments of the present disclosure provide a display panel 20. As shown in FIGS. 2, 3 and 4, the display panel 20 includes the display substrate 2 as described in any of the above embodiments and a control integrated circuit 3. It will be noted that, the control integrated circuit 3 may be a timing control chip.

The control integrated circuit 3 is coupled to the initialization signal lines STV in the scanning control circuit 100 in the display substrate 2. The control integrated circuit 3 is configured to: transmit a first initialization signal to an initialization signal line STV corresponding to a display area A that does not need to display an image, so as to tum off a scanning control sub-circuit 110 corresponding to the display area A that does not need to display an image; and transmit second initialization signals to initialization signal lines STV corresponding to a display area A that needs to display an image, so as to turn on a scanning control sub-circuit 110 corresponding to the display area A that needs to display an image.

In some embodiments, in a case where at least two adjacent display areas A need to display an image, along the second direction Y, in adjacent two display areas A, a second initialization signal transmitted by an initialization signal line STV corresponding to a next display area A is the same as a signal output by a last output terminal OPUT of a scanning control sub-circuit 110 corresponding to a current display area A, so as to realize simultaneous display of the adjacent two display areas A.

Some embodiments of the present disclosure provide a display device 1. As shown in FIG. 1A, the display device 1 includes the display panel 20 in any of the above embodiments.

In some embodiments, the display device 1 may be folded along a boundary of adjacent display areas A.

Figure 22:
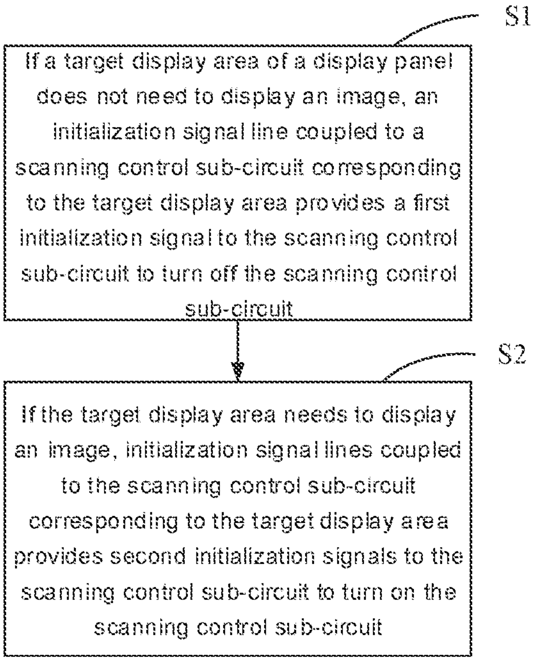
FIG. 22 is a flow diagram of a method for driving a scanning control circuit. in accordance with some embodiments.

Some embodiments of the present disclosure further provide a method for driving a scanning control circuit, which is applied to the scanning control circuit in any of the above embodiments. As shown in FIG. 22, the method includes S1 and S2.

In S1, if a target display area of the display panel 20 does not need to display an image, an initialization signal line STV coupled to a scanning control sub-circuit 110 corresponding to the target display area provides a first initialization signal to the scanning control sub-circuit 110 to turn off the scanning control sub-circuit 110.

In the above step, a signal input terminal of a first transistor in a first-stage shift register in the scanning control sub-circuit 110 corresponding to the target display area is turned off under control of the first initialization signal, so as to turn off the corresponding scanning control sub-circuit 110.

In S2, if the target display area needs to display an image, initialization signal lines STV coupled to the scanning control sub-circuit 110 corresponding to the target display area provides second initialization signals to the scanning control sub-circuit 110 to turn on the scanning control sub-circuit 110.

In the above step, the signal input terminal of the first transistor in the first-stage shift register of the scanning control sub-circuit 110 corresponding to the target display area is turned on under control of the second initialization signal, so as to tum on the corresponding scanning control sub-circuit 110.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A scanning control circuit configured to be applied to a display panel, wherein the display panel has Q display areas, Q being greater than or equal to 2, and Q being an integer; the scanning control circuit comprising:

2Q initialization signal lines including Q gate initialization signal lines and Q light-emitting initialization signal lines;

Q scanning control sub-circuits, each scanning control sub-circuit corresponding to a display area, the scanning control sub-circuit including:

a gate scanning control unit coupled to a gate initialization signal line, the gate scanning control unit being configured to be turned on under control of a gate initialization signal from the gate initialization signal line to drive the corresponding display area to display an image, and to be turned off under control of another gate initialization signal from the gate initialization signal line to drive the corresponding display area not to display an image, wherein different gate scanning control units are coupled to different gate initialization signal lines; and a light-emitting scanning control unit coupled to a light-emitting initialization signal line, the light-emitting scanning control unit being configured to be turned on under control of a light-emitting initialization signal from the light-emitting initialization signal line to drive the corresponding display area to display an image, and to be turned off under control of another light-emitting initialization signal from the light-emitting initialization signal line to drive the corresponding display area not to display an image, wherein different light-emitting scanning control units are coupled to different light-emitting initialization signal lines.

2. The scanning control circuit according to claim 1, wherein a gate scanning control unit and a light-emitting scanning control unit in a same scanning control sub-circuit are arranged side by side along a first direction; the Q display areas are arranged side by side along a second direction; the first direction is substantially perpendicular to the second direction; and gate scanning control units in the Q scanning control sub-circuits are arranged side by side along the second direction, and light-emitting scanning control units in the Q scanning control sub-circuits are arranged side by side along the second direction.

3. The scanning control circuit according to claim 2, wherein Q is equal to 2;

two gate initialization signal lines extend along the second direction, and the two gate initialization signal lines are disposed on two opposite sides of the gate scanning control units, respectively; and two light-emitting initialization signal lines extend along the second direction, and the two light-emitting initialization signal lines are disposed on two opposite sides of the light-emitting scanning control units, respectively.

4. The scanning control circuit according to claim 1, wherein in each scanning control sub-circuit, the gate scanning control unit is closer to the corresponding display area than the light-emitting scanning control unit.

5. The scanning control circuit according to claim 1, wherein the gate scanning control unit includes a plurality of gate shift registers connected in cascade, first S gate shift registers being coupled to the gate initialization signal line, S being greater than or equal to 1, and S being an integer; and/or the light-emitting scanning control unit includes a plurality of light-emitting shift registers connected in cascade, first S light-emitting shift registers being coupled to the light-emitting initialization signal line, S being greater than or equal to 1, and S being an integer.

6. A method for driving a scanning control circuit, for use in driving the scanning control circuit according to claim 1; the method comprising:

if a target display area of the display panel does not need to display an image, providing, by an initialization signal line coupled to a scanning control sub-circuit corresponding to the target display area, a first initialization signal to the scanning control sub-circuit to turn off the scanning control sub-circuit; and if the target display area needs to display an image, providing, by initialization signal lines coupled to the scanning control sub-circuit corresponding to the target display area, second initialization signals to the scanning control sub-circuit to turn on the scanning control sub-circuit;

wherein the first initialization signal includes the another gate initialization signal or the another light-emitting initialization signal, and the second initialization signals include the gate initialization signal and the light-emitting initialization signal.

7. A display substrate, having Q display areas, Q being greater than or equal to 2, Q being an integer; the display substrate comprising:

a substrate;

at least one scanning control circuit disposed on the substrate, the scanning control circuit including:

2Q initialization signal lines including Q gate initialization signal lines and Q light-emitting initialization signal lines;

Q scanning control sub-circuits, each scanning control sub-circuit corresponding to a display area, the scanning control sub-circuit including:

a gate scanning control unit coupled to a gate initialization signal line, the gate scanning control unit being configured to be turned on under control of a gate initialization signal from the gate initialization signal line to drive the corresponding display area to display an image, and to be turned off under control of another gate initialization signal from the gate initialization signal line to drive the corresponding display area not to display an image, wherein different gate scanning control units are coupled to different gate initialization signal lines; and a light-emitting scanning control unit coupled to a light-emitting initialization signal line, the light-emitting scanning control unit being configured to be turned on under control of a light-emitting initialization signal from the light-emitting initialization signal line to drive the corresponding display area to display an image, and to be turned off under control of another light-emitting initialization signal from the light-emitting initialization signal line to drive the corresponding display area not to display an image, wherein different light-emitting scanning control units are coupled to different light-emitting initialization signal lines.

8. The display substrate according to claim 7, wherein the Q display areas include a first display area and a second display area arranged side by side along a second direction, and in the scanning control circuit, the Q scanning control sub-circuits include a first scanning control sub-circuit corresponding to the first display area, a second scanning control sub-circuit corresponding to the second display area, and the Q gate initialization signal lines include a first gate initialization signal line and a second gate initialization signal line;

the first scanning control sub-circuit includes a first gate scanning control unit, and the second scanning control sub-circuit includes a second gate scanning control unit; the first gate initialization signal line is coupled to the first gate scanning control unit, and the second gate initialization signal line is coupled to the second gate scanning control unit;

wherein each of the first scanning control sub-circuit and the second scanning control sub-circuit further includes a first gate voltage signal line, a second gate voltage signal line, a first gate clock signal line and a second gate clock signal line that are coupled to a corresponding one of the first gate scanning control unit and the second gate scanning control unit; and along a first direction and in a direction pointing from an inside to an outside of a corresponding one of the first display area and the second display area, the second gate initialization signal line, the second gate voltage signal line, the first gate voltage signal line, the first gate clock signal line, the second gate clock signal line and the first gate initialization signal line are arranged in sequence, and the first gate scanning control unit and the second gate scanning control unit are located between the second gate initialization signal line and the first gate voltage signal line; the first direction is substantially perpendicular to the second direction.

9. The display substrate according to claim 7, wherein in the scanning control circuit, the Q scanning control sub-circuits include a second scanning control sub-circuit, and the Q gate initialization signal lines include a second gate initialization signal line; the second scanning control sub-circuit includes a second gate scanning control unit; the second gate scanning control unit includes a plurality of second gate shift registers that are connected in cascade and arranged side by side, and each second gate shift register includes a second gate input transistor; and the second scanning control sub-circuit further includes:

S second gate initial connection lines respectively corresponding to first S second gate shift registers, an end of each second gate initial connection line being coupled to the second gate initialization signal line, and another end of each second gate initial connection line being coupled to a second gate input transistor in a corresponding second gate shift register, S being greater than or equal to 1, and S being an integer.

10. The display substrate according to claim 9, wherein the display substrate comprises a source-drain conductive layer, and the second scanning control sub-circuit further includes:

a plurality of second gate connection lines respectively corresponding to remaining second gate shift registers except the first S second gate shift registers, wherein an end of each second gate connection line is coupled to an output terminal of a previous-stage second gate shift register, and another end of each second gate connection line is coupled to a second gate input transistor in a corresponding second gate shift register; and the plurality of second gate connection lines are located in the source-drain conductive layer.

11. The display substrate according to claim 7, wherein the Q scanning control sub-circuits include a second scanning control sub-circuit, and the second scanning control sub-circuit includes at least one second gate initial connection line; the display substrate comprises a semiconductor layer, a first gate conductive layer, a second gate conductive layer and a source-drain conductive layer that are sequentially disposed on the substrate; and the second gate initial connection line includes:

at least one first connection segment located in the source-drain conductive layer, an orthogonal projection of the first connection segment on the substrate being separated from an orthogonal projection of any signal line in the second scanning control sub-circuit on the substrate; and at least one second connection segment located in the semiconductor layer, an orthogonal projection of the second connection segment on the substrate being separated from the orthogonal projection of the any signal line in the second scanning control sub-circuit on the substrate;

wherein a resistivity of the second connection segment is greater than a resistivity of the first connection segment.

12. The display substrate according to claim 11, wherein the Q gate initialization signal lines include a second gate initialization signal line, and the scanning control circuit further includes a second gate voltage signal line; and the second gate initial connection line further includes: at least one third connection segment located in the first gate conductive layer or the second gate conductive layer, an orthogonal projection of the third connection segment on the substrate intersecting with an orthogonal projection of at least one of the second gate initialization signal line and the second gate voltage signal line on the substrate; or the Q gate initialization signal lines include a second gate initialization signal line, and the scanning control circuit further includes a second gate voltage signal line; and the second gate initial connection line further includes at least one third connection segment located in the first gate conductive layer or the second gate conductive layer, an orthogonal projection of the third connection segment on the substrate intersecting with an orthogonal projection of at least one of the second gate initialization signal line and the second gate voltage signal line on the substrate; connection segments included in the second gate initial connection line are connected in sequence; and the source-drain conductive layer includes a plurality of first connection patterns, and each first connection pattern electrically connects adjacent two connection segments of the second gate initial connection line through via holes.

13. The display substrate according to claim 11, wherein the Q gate initialization signal lines include a second gate initialization signal line, and the scanning control circuit further includes a second gate voltage signal line; the second scanning control sub-circuit further includes a second gate scanning control unit, the second gate scanning control unit includes second gate shift registers, and the second gate shift registers each include a second gate input transistor; the second gate initial connection line includes a first connection segment, a second connection segment and a third connection segment that are connected in sequence; an orthogonal projection of the third connection segment on the substrate intersects with orthogonal projections of the second gate voltage signal line and the second gate initialization signal line on the substrate;

and an end of the first connection segment away from the third connection segment is coupled to a corresponding second gate input transistor, and an end of the third connection segment away from the first connection segment is coupled to the second gate initialization signal line; and/or the Q gate initialization signal lines include a second gate initialization signal line, and the scanning control circuit further includes a second gate voltage signal line; the second scanning control sub-circuit further includes a second gate scanning control unit, the second gate scanning control unit includes second gate shift registers, and the second gate shift registers each include a second gate input transistor; the second gate initial connection line includes a first connection segment, a second connection segment and a third connection segment that are connected in sequence; an orthogonal projection of the third connection segment on the substrate intersects with orthogonal projections of the second gate voltage signal line and the second gate initialization signal line on the substrate; an end of the first connection segment away from the third connection segment is coupled to a corresponding second gate input transistor, and an end of the third connection segment away from the first connection segment is coupled to the second gate initialization signal line; and the second gate initial connection line is located between adjacent two second gate shift registers.

14. The display substrate according to claim 7, wherein in the scanning control circuit, the Q scanning control sub-circuits include a first scanning control sub-circuit and the Q gate initialization signal lines include a first gate initialization signal line; the first scanning control sub-circuit includes a first gate scanning control unit; the first gate scanning control unit includes a plurality of first gate shift registers that are connected in cascade and arranged side by side, and each first gate shift register includes a first gate input transistor; and the first scanning control sub-circuit further includes:

S first gate initial connection lines respectively corresponding to first S first gate shift registers, an end of each first gate initial connection line being coupled to the first gate initialization signal line, and another end of each first gate initial connection line being coupled to a first gate input transistor in a corresponding first gate shift register.

15. The display substrate according to claim 7, wherein the Q display areas include a first display area and a second display area arranged side by side along a second direction; in the scanning control circuit, the Q scanning control sub-circuits include a first scanning control sub-circuit corresponding to the first display area, a second scanning control sub-circuit corresponding to the second display area, and the Q light-emitting initialization signal lines include a first light-emitting initialization signal line and a second light-emitting initialization signal line;

the first scanning control sub-circuit includes a first light-emitting scanning control unit, and the second scanning control sub-circuit includes a second light-emitting scanning control unit; the first light-emitting initialization signal line is coupled to the first light-emitting scanning control unit, and the second light-emitting initialization signal line is coupled to the second light-emitting scanning control unit;

wherein each of the first scanning control sub-circuit and the second scanning control sub-circuit further includes a plurality of light-emitting initialization signal lines, a first light-emitting voltage signal sub-line, a second light-emitting voltage signal sub-line, a second light-emitting voltage signal line, a first light-emitting clock signal line and a second light-emitting clock signal line that are coupled to a corresponding one of the first light-emitting scanning control unit and the second light-emitting scanning control unit; and along a first direction and in a direction pointing from an inside to an outside of a corresponding one of the first display area and the second display area, the second light-emitting initialization signal line, the first light-emitting voltage signal sub-line, the second light-emitting voltage signal line, the second light-emitting voltage signal sub-line, the first light-emitting clock signal line, the second light-emitting clock signal line and the first light-emitting initialization signal line are arranged in sequence, and the first light-emitting scanning control unit and the second light-emitting scanning control unit are located between the first light-emitting voltage signal sub-line and the first light-emitting clock signal line;

the first direction is substantially perpendicular to the second direction.

16. The display substrate according to claim 15, wherein the second light-emitting scanning control unit includes a plurality of second light-emitting shift registers that are connected in cascade and arranged side by side along the second direction, and each second light-emitting shift register includes a second light-emitting input transistor; and the second light-emitting control sub-circuit further includes:

S second light-emitting initial connection lines respectively corresponding to first S second light-emitting shift registers, an end of each second light-emitting initial connection line being coupled to the second light-emitting initialization signal line, another end of each second light-emitting initial connection line being coupled to a second light-emitting input transistor in a corresponding second light-emitting shift register, S being greater than or equal to 1, and S being an integer.

17. The display substrate according to claim 16, wherein the display substrate comprises a semiconductor layer, a first gate conductive layer, a second gate conductive layer and a source-drain conductive layer that are sequentially disposed on the substrate;

the second light-emitting initial connection line includes:

at least one fourth connection segment located in the source-drain conductive layer, an orthogonal projection of the fourth connection segment on the substrate being separated from an orthogonal projection of any signal line in the second light-emitting control sub-circuit on the substrate;

at least one fifth connection segment located in the semiconductor layer, an orthogonal projection of the fifth connection segment on the substrate being separated from the orthogonal projection of the any signal line in the second light-emitting control sub-circuit on the substrate, wherein a resistivity of the fifth connection segment is greater than a resistivity of the fourth connection segment; and at least one sixth connection segment located in the first gate conductive layer or the second gate conductive layer; an orthogonal projection of the sixth connection segment on the substrate intersecting with an orthogonal projection of at least one of the second light-emitting initialization signal line, the first light-emitting voltage signal sub-line and the second light-emitting voltage signal line on the substrate.

18. The display substrate according to claim 17, wherein connection segments included in the second light-emitting initial connection line are connected in sequence; and the source-drain conductive layer includes a plurality of second connection patterns, and each second connection pattern electrically connects adjacent two connection segments of the second light-emitting initial connection line through via holes; and/or the second light-emitting initial connection line includes a fourth connection segment, a first sixth connection segment, a fifth connection segment and a second sixth connection segment that are connected in sequence; an orthogonal projection of the first sixth connection segment on the substrate intersects with an orthogonal projection of the second light-emitting voltage signal line on the substrate; an orthogonal projection of the second sixth connection segment on the substrate intersects with orthogonal projections of the first light-emitting voltage signal sub-line and the second light-emitting initialization signal line on the substrate; and an end of the fourth connection segment away from the second sixth connection segment is coupled to a corresponding second light-emitting input transistor, and an end of the second sixth connection segment away from the fourth connection segment is coupled to the second light-emitting initialization signal line.

19. A display panel, comprising:

the display substrate according to claim 7;

a control integrated circuit coupled to the initialization signal lines in the scanning control circuit in the display substrate, the control integrated circuit being configured to: transmit a first initialization signal to an initialization signal line corresponding to a display area that does not need to display an image, so as to turn off a scanning control sub-circuit corresponding to the display area that does not need to display an image; and transmit second initialization signals to initialization signal lines corresponding to a display area that needs to display an image, so as to turn on a scanning control sub-circuit corresponding to the display area that needs to display an image, wherein the first initialization signal includes the another gate initialization signal or the another light-emitting initialization signal, and the second initialization signals include the gate initialization signal and the light-emitting initialization signal.

20. A display device, comprising the display panel according to claim 19, wherein the display device is capable of being folded along a boundary line of adjacent display areas.

* * * * *